US010412356B2

(12) United States Patent
Eto

(10) Patent No.: US 10,412,356 B2
(45) Date of Patent: Sep. 10, 2019

(54) IMAGE PROCESSING APPARATUS AND IMAGE PROCESSING METHOD

(71) Applicant: SONY CORPORATION, Tokyo (JP)

(72) Inventor: Hiroaki Eto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,399

(22) PCT Filed: Mar. 2, 2016

(86) PCT No.: PCT/JP2016/056352
§ 371 (c)(1),
(2) Date: Sep. 18, 2017

(87) PCT Pub. No.: WO2016/152414
PCT Pub. Date: Sep. 29, 2016

(65) Prior Publication Data
US 2018/0077397 A1 Mar. 15, 2018

(30) Foreign Application Priority Data
Mar. 26, 2015 (JP) ................. 2015-063983

(51) Int. Cl.
*H04N 9/73* (2006.01)
*H04N 9/04* (2006.01)
(Continued)

(52) U.S. Cl.
CPC ............... *H04N 9/735* (2013.01); *G06T 1/00* (2013.01); *G06T 3/4015* (2013.01); *G06T 5/008* (2013.01);
(Continued)

(58) Field of Classification Search
CPC ........ H04N 9/735; H04N 9/0451; H04N 9/68; H04N 9/646; H04N 2209/046; G06T 5/008; G06T 3/4015
See application file for complete search history.

(56) References Cited

U.S. PATENT DOCUMENTS

2006/0103739 A1 5/2006 Wada
2008/0285884 A1 11/2008 Nishijima
(Continued)

FOREIGN PATENT DOCUMENTS

EP 2515543 A2 10/2012
JP 2000-050151 A 2/2000
(Continued)

OTHER PUBLICATIONS

International Search Report and Written Opinion of PCT Application No. PCT/JP2016/056352, dated May 24, 2016, 06 pages ISRWO.
(Continued)

*Primary Examiner* — Ahmed A Berhan
(74) *Attorney, Agent, or Firm* — Chip Law Group

(57) ABSTRACT

Provided are an apparatus and a method for generating an image with reduced blown-out highlight regions. The apparatus includes an image processing section that inputs a RAW image corresponding to an output image of an imaging device. The image processing section performs a demosaicing process, that generates RGB images having all pixels set to respective colors of RGB by demosaicing the RAW image and performs a white-balancing process that white-balances the respective RGB images resulting after the demosaicing process. The image processing section performs a pixel value estimation process that performs a G pixel value estimation process in a saturated pixel region of the G image resulting after the white balancing process by using pixel values of the R and B images resulting after the white
(Continued)

balancing process at the same pixel position as the G pixel subject to pixel value estimation.

12 Claims, 17 Drawing Sheets

(51) Int. Cl.
    *H04N 9/68*     (2006.01)
    *H04N 9/64*     (2006.01)
    *G06T 5/00*     (2006.01)
    *H04N 5/355*     (2011.01)
    *G06T 3/40*     (2006.01)
    *G06T 1/00*     (2006.01)

(52) U.S. Cl.
    CPC ......... *H04N 5/3559* (2013.01); *H04N 9/0451* (2018.08); *H04N 9/646* (2013.01); *H04N 9/68* (2013.01); *H04N 2209/046* (2013.01)

(56) References Cited

U.S. PATENT DOCUMENTS

| 2012/0293696 | A1* | 11/2012 | Tanaka .................. H04N 9/045 348/280 |
| 2012/0294527 | A1 | 11/2012 | Lukac et al. |
| 2014/0321742 | A1 | 10/2014 | Lukac et al. |
| 2014/0321743 | A1 | 10/2014 | Lukac et al. |

FOREIGN PATENT DOCUMENTS

| JP | 2008-177872 A | 7/2008 |
| JP | 4121493 B2 | 7/2008 |
| JP | 2010-068064 A | 3/2010 |
| JP | 2010-103700 A | 5/2010 |
| JP | 4932504 B2 | 5/2012 |
| JP | 5567063 B2 | 8/2014 |
| JP | 5803233 B2 | 11/2015 |
| JP | 6052902 B2 | 12/2016 |
| JP | 6057302 B2 | 1/2017 |

OTHER PUBLICATIONS

Extended European Search Report of EP Patent Application No. 16768317.6, dated Oct. 4, 2018, 10 pages.

Masood, et al., "Automatic Correction of Saturated Regions in Photographs using Cross-Channel Correlation", The Eurographics Association and Blackwell Publishing Ltd. vol. 28, Issue 7, XP007917630, 09 pages.

Office Action for CN Patent Application No. 201680016399.X, dated Dec. 5, 2018, 08 pages of Office Action and 08 pages of English Translation.

Masood, et al., Automatic Correction of Saturated Regions in Photographs using Cross-Channel Correlation, Pacific Graphics 2009, vol. 48, Issue 7, 5 pages.

* cited by examiner

FIG. 2

(1) CONFIGURATION EXAMPLE OF IMAGING DEVICE
[BAYER PATTERN ARRANGEMENT]

FIG. 3(a) RAW IMAGE (IMAGING DEVICE OUTPUT)

FIG. 3(b) R DEMOSAICED IMAGE

FIG. 3(c) G DEMOSAICED IMAGE

FIG. 3(d) B DEMOSAICED IMAGE

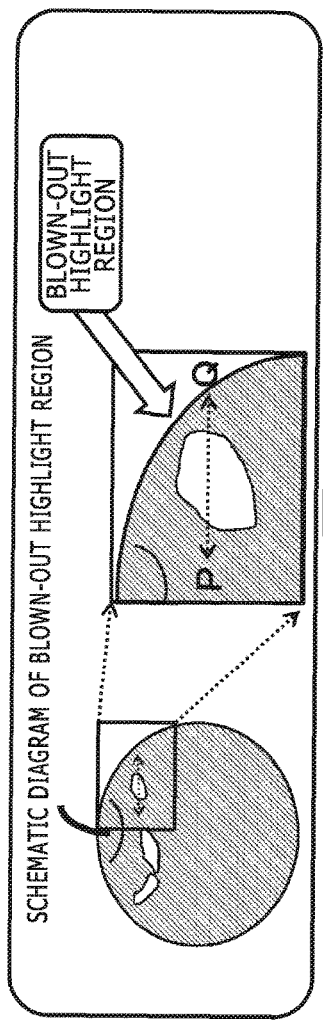

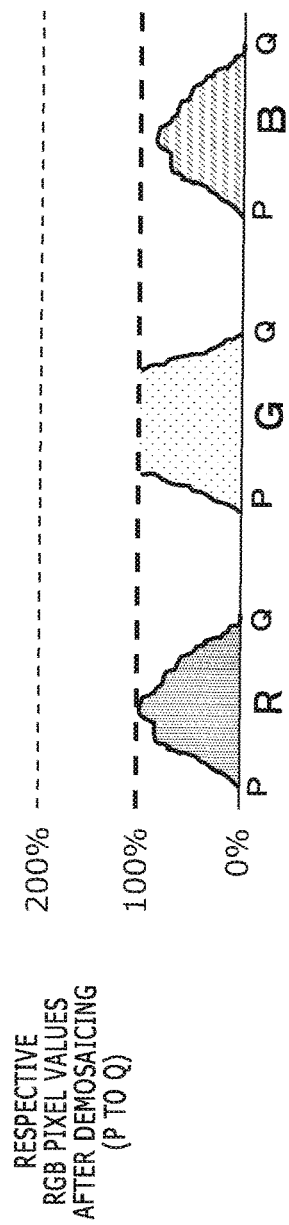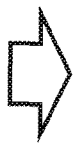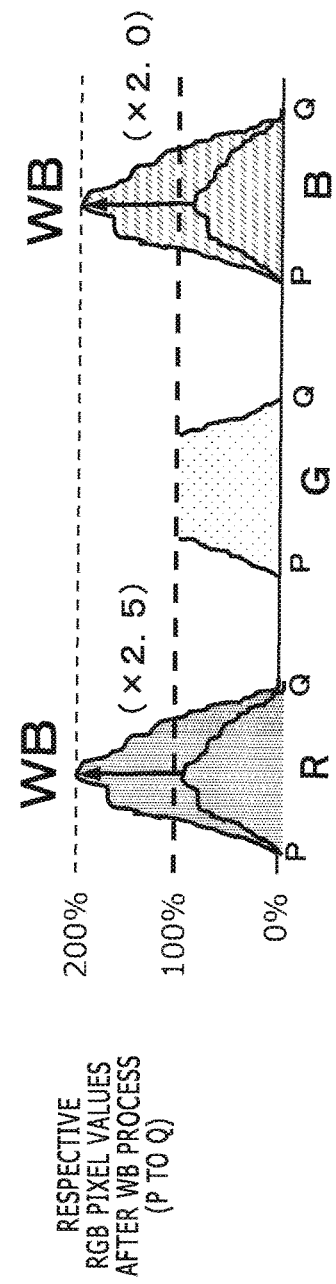
FIG. 6(a)
FIG. 6(b)

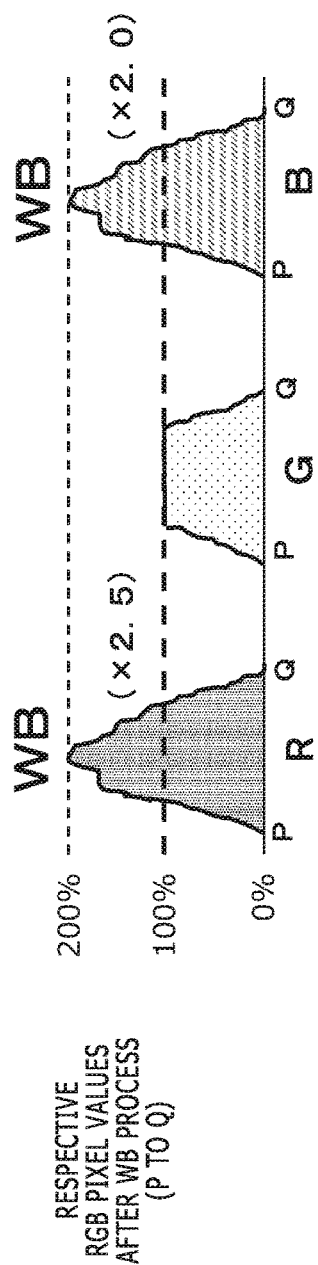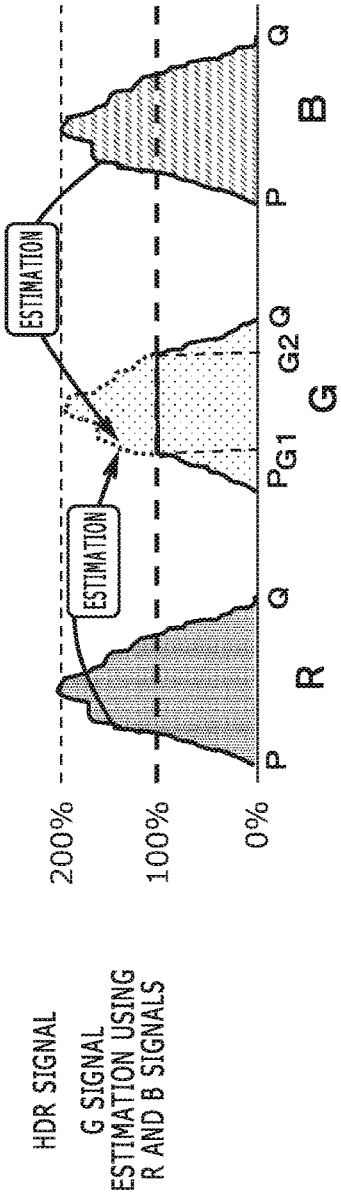

COLOR = LIGHT SOURCE CHARACTERISTIC × OBJECT'S REFLECTANCE × VISUAL CHARACTERISTIC
FIG. 10(a)
LIGHT SOURCE: $S(\lambda)$
FIG. 10(b)
OBJECT: $R(\lambda)$
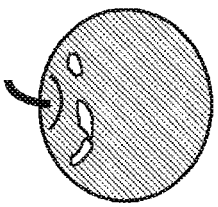
FIG. 10(c)
VISION: $\overline{x}(\lambda)\overline{y}(\lambda)\overline{z}(\lambda)$
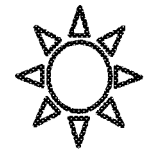
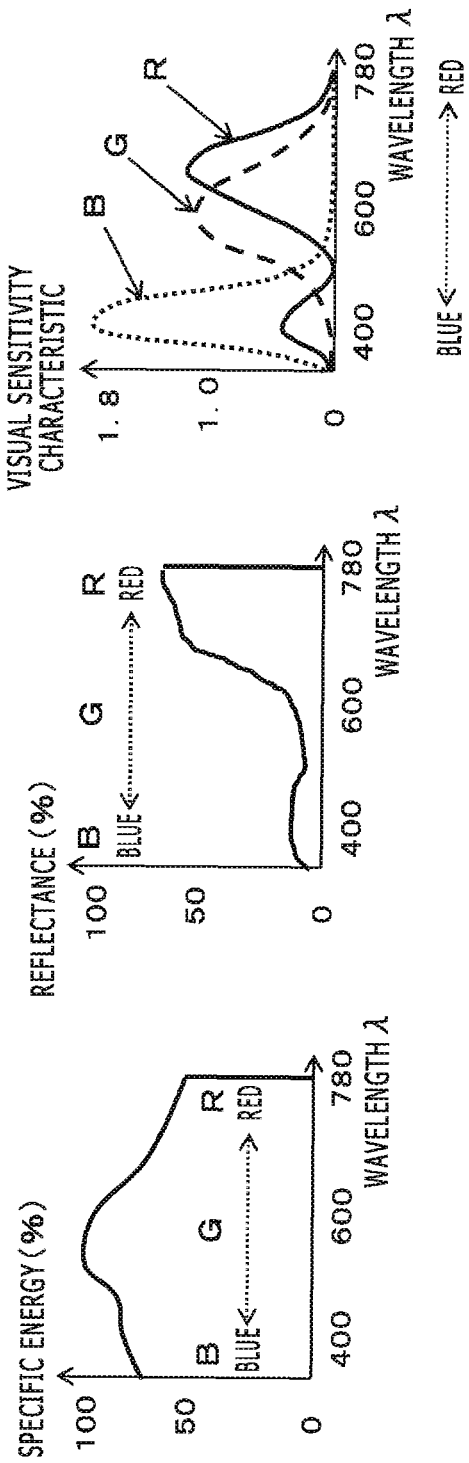

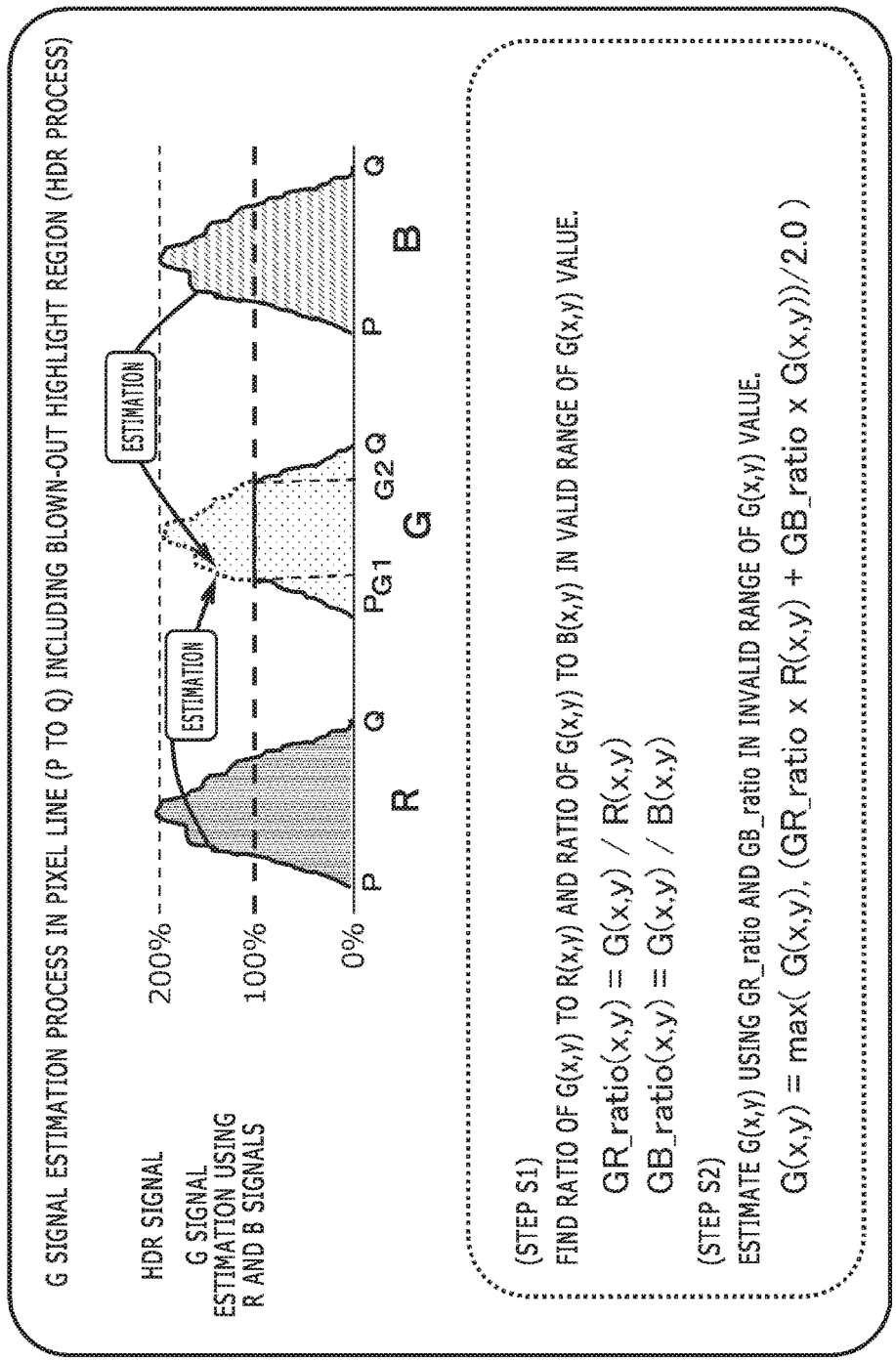

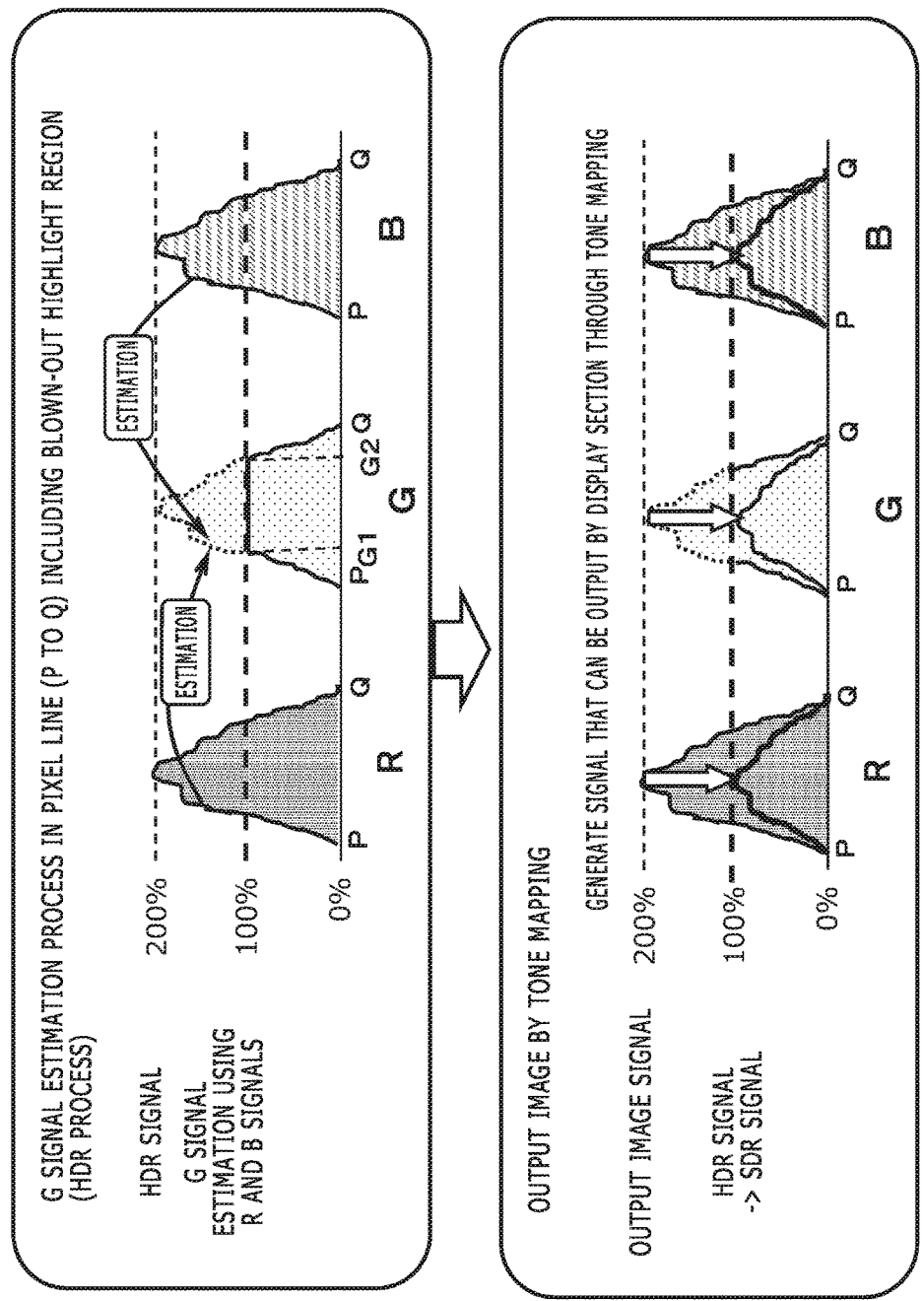

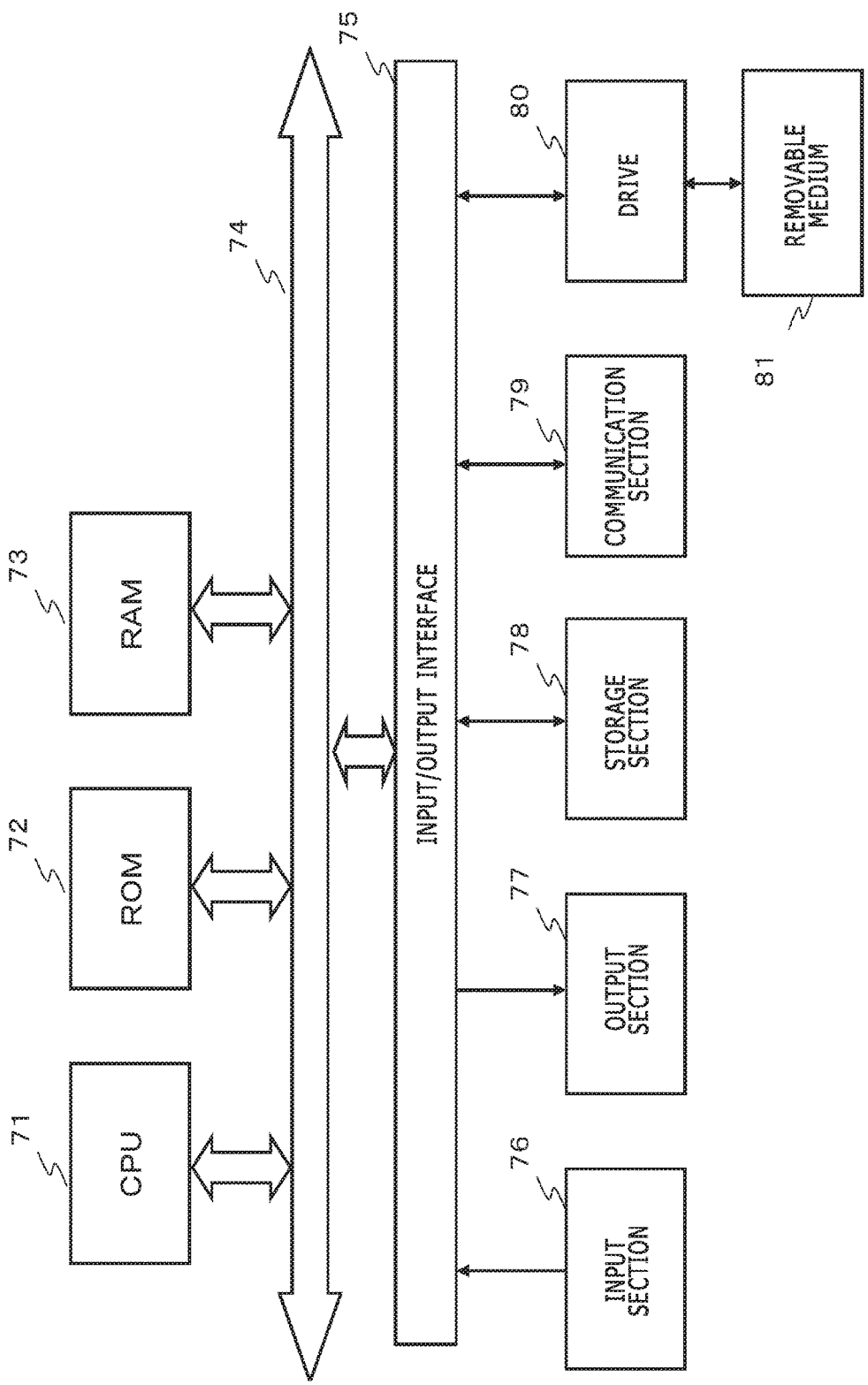

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/056352 filed on Mar. 2, 2016, which claims priority benefit of Japanese Patent Application No. JP 2015-063983 filed in the Japan Patent Office on Mar. 26, 2015. Each of the above-referenced applications is hereby incorporated herein by reference in its entirety.

TECHNICAL FIELD

The present disclosure relates to an image processing apparatus, an image processing method, and a program. In more detail, the present disclosure relates to an image processing apparatus, an image processing method, and a program for performing processes of restoring a pixel region such as blown-out highlight region within a shot image to its original shades of gray and colors.

BACKGROUND ART

Solid-state imaging devices such as charge coupled device (CCD) image sensors and complementary metal oxide semiconductor (CMOS) image sensors used, for example, in a video camera and a digital still camera realize photo-electric conversion that includes accumulating electric charge in proportion to the amount of incident light and outputting an electric signal proportional to the accumulated electric charge. However, a photo-electric conversion device has its upper limit to its amount of electric charge accumulated, and when a fixed amount of light or more is received, the amount of accumulated electric charge reaches a saturation level. As a result, so-called blown-out highlight occurs that causes subject regions having a fixed level of brightness or more to be set to a saturated luminance level.

One technique of avoiding such a blown-out highlight is a process of controlling sensitivity to its optimal level by controlling a charge accumulation period of the photo-electric conversion device and adjusting exposure time, for example, in accordance with a change in external light. For a bright subject, for example, the exposure time is reduced by releasing the shutter at high speed, reducing the electric charge accumulation period of the photo-electric conversion device and outputting an electric signal before the amount of accumulated electric charge reaches the saturation level. Such a process makes it possible to output an image that accurately reproduces shades of gray appropriate to the subject.

However, releasing the shutter at high speed during shooting of a subject having mixed bright and dark areas gives rise to degraded image quality due to signal to noise ratio (S/N) deterioration resulting from insufficient exposure time in dark areas. In order to accurately reproduce luminance levels of bright and dark areas in a shot image of a subject having mixed bright and dark areas, a process is required to achieve high S/N by using a long exposure time in pixels with only slight incident light on an image sensor and avoid saturation in pixels with much incident light.

Consecutively shooting a plurality of images with different exposure times and merging these images are known as a technique of realizing such a process. That is, the technique generates a single image by using a merging process that includes consecutively and individually shooting long-time exposure images and short-time exposure images and using long-time exposure images for dark image areas and short-time exposure images for bright image areas that may lead to blown-out highlights in long-time exposure images. Thus, it is possible to acquire an image having a wide dynamic range with no blown-out highlights, i.e., a wide dynamic range image (high dynamic range (HDR) image) by merging a plurality of different exposed images.

For example, PTL 1 (JP 2000-50151A) discloses a configuration for acquiring a wide dynamic range image by shooting two images with a plurality of different exposure time settings and merging these images.

However, such a process of using a plurality of images, long- and short-time exposure images, can be used as a process for still images. However, it is difficult to use the process for videos. The reason for this is that shooting long- and short-time exposure images alternately for each of frames making up a video and processing the images result in a variety of problems including lower display frame rate, increased processing burden, and difficulty in achieving real-time display.

If it is necessary to proceed with the process after checking a moving image shot with a camera in real time, for example, as when a surgery is conducted using an endoscope, identicality between shot and observed images, i.e., real-timeness, is required.

Displaying an image after a process of merging a plurality of images as described above leads to delay in displaying the image. Therefore, when real-time display is required as with endoscope, it is not possible to perform the multi-image merging process.

CITATION LIST

Patent Literature

[PTL 1]
JP 2000-50151A

SUMMARY

Technical Problem

The present disclosure has been devised, for example, in light of the foregoing, and it is an object of the disclosure to provide an image processing apparatus, an image processing method, and a program that more accurately reproduce colors and shades of gray of high luminance regions such as blown-out highlights included in shot images, videos and still images alike, to generate a high-quality image.

Solution to Problem

A first aspect of the present disclosure is an image processing apparatus that includes an image processing section that inputs a RAW image corresponding to an output image of an imaging device and performs image processing on the input RAW image. The image processing section includes a demosaicing process section, a white-balancing process execution section, and a pixel value estimation section. The demosaicing process section generates red, green, and blue (RGB) images having all pixels set to respective colors of RGB by demosaicing the RAW image. The white-balancing process execution section white-balances the respective RGB images generated by the demosaicing process section. The pixel value estimation section performs a G pixel value estimation process in a saturated pixel region of the G image resulting after the white balancing. The pixel value estimation section performs the pixel value estimation process by using pixel values of the R and B images resulting after the white-balancing process at the same pixel position as the G pixel subject to pixel value estimation.

Further, a second aspect of the present disclosure is an image processing method for performing image processing in an image processing apparatus. The image processing apparatus includes an image processing section that inputs a RAW image corresponding to an output image of an imaging device and performs image processing on the input RAW image. The image processing section performs a demosaicing process, a white-balancing process, and a pixel value estimation process. The demosaicing process generates RGB images having all pixels set to respective colors of RGB by demosaicing the RAW image. The white-balancing process white-balances the respective RGB images generated by the demosaicing process. The pixel value estimation process performs a G pixel value estimation process in a saturated pixel region of the G image resulting after the white-balancing process. In the pixel value estimation process, the image processing section performs the pixel value estimation process by using pixel values of the R and B images resulting after the white-balancing process at the same pixel position as the G pixel subject to pixel value estimation.

Further, a third aspect of the present disclosure is a program that causes an image processing apparatus to perform image processing. The image processing apparatus includes an image processing section that inputs a RAW image corresponding to an output image of an imaging device and performs image processing on the input RAW image. The program causes the image processing section to perform a demosaicing process, a white-balancing process, and a pixel value estimation process. The demosaicing process generates RGB images having all pixels set to respective colors of RGB by demosaicing the RAW image. The white-balancing process white-balances the respective RGB images generated by the demosaicing process. The pixel value estimation process performs a G pixel value estimation process in a saturated pixel region of the G image resulting after the white-balancing process.

In the pixel value estimation process, the program causes the image processing section to perform the pixel value estimation process by using pixel values of the R and B images resulting after the white-balancing process at the same pixel position as the G pixel subject to pixel value estimation.

It should be noted that the program according to the present disclosure is, for example, a program that can be provided to an information processing apparatus capable of executing various program codes or to a computer system in a computer-readable form by a storage medium or a communication medium. A process appropriate to the program is realized on the information processing apparatus and the computer system by providing such a program in a computer-readable form.

Further other objects, features, and advantages of the present disclosure will become apparent from detailed description based on an embodiment of the present disclosure which will be described later and the accompanying drawings. It should be noted that the system in the present specification refers to a configuration of a logical set of a plurality of apparatuses and is not limited to apparatuses having respective configurations that are provided in the same housing.

Advantageous Effects of Invention

According to a configuration of an embodiment of the present disclosure, an apparatus and a method are realized for generating an image with reduced blown-out highlight regions that represents colors and shades of gray of a subject with high accuracy.

Specifically, the apparatus includes an image processing section that inputs a RAW image corresponding to an output image of an imaging device and performs image processing on the input RAW image. The image processing section performs a demosaicing process, a white-balancing process, and further a pixel value estimation process. The demosaicing process generates RGB images having all pixels set to respective colors of RGB by demosaicing the RAW image. The white-balancing process white-balances the respective RGB images resulting after the demosaicing process. The pixel value estimation process performs a G pixel value estimation process in a saturated pixel region of the G image resulting after the white balancing process. In the pixel value estimation process, the pixel value estimation process is performed by using pixel values of the R and B images resulting after the white balancing process at the same pixel position as the G pixel subject to pixel value estimation.

The processes in the present disclosure make it possible to generate and output an image with reduced blown-out highlight regions that represents colors and shades of gray of a subject with high accuracy.

It should be noted that the effects described in the present specification are merely illustrative and are not restrictive and that there may be additional effects.

BRIEF DESCRIPTION OF DRAWINGS

FIG. 2 is a diagram describing the Bayer pattern, an example of pixel arrangement in an imaging device.

FIGS. 3(a), 3(b), 3(c) and 3(d) are diagrams describing a demosaicing process.

FIGS. 4(a) and 4(b) are diagrams describing correspondence between blown-out highlight regions and images resulting after demosaicing.

FIGS. 6(a) and 6(b) are diagrams describing a white-balancing (WB) process.

FIGS. 8(a) and 8(b) are diagrams describing a G pixel value estimation process.

FIGS. 10(a), 10(b) and 10(c) are diagrams describing colors observed by humans.

FIG. 11 is a diagram describing the G pixel value estimation process.

FIGS. 12(a) and 12(b) are diagrams describing a tone mapping process.

FIG. 17 is a diagram describing a configuration example of the image processing apparatus of the present disclosure.

DESCRIPTION OF EMBODIMENT

Figure 1:
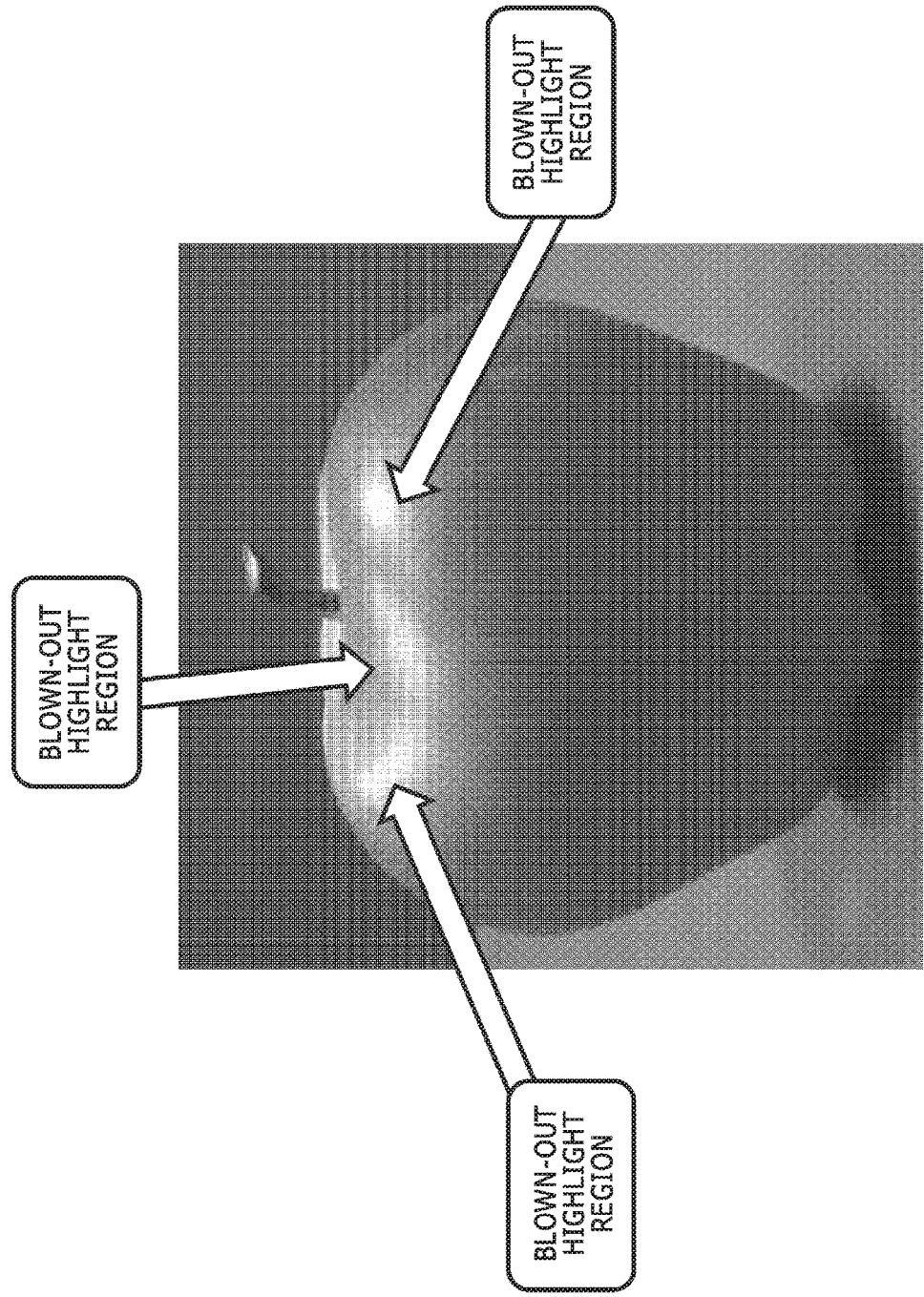
FIG. 1 is a diagram describing an image with blown-out highlights as an example of a shot image of an imaging apparatus.

A detailed description will be given below of an image processing apparatus, an image processing method, and a program of the present disclosure with reference to drawings. It should be noted that the description will be given according to the following items:

1. About the outline of processes performed by the image processing apparatus of the present disclosure 2. About an embodiment for reducing blown-out highlight regions by performing a pixel value estimation process 3. About a processing sequence of processes performed by the image processing apparatus 4. About a configuration example of the image processing apparatus 5. Conclusion of the configuration of the present disclosure 1. About the Outline of Processes Performed by the Image Processing Apparatus of the Present Disclosure A description will be given first of the outline of processes performed by the image processing apparatus of the present disclosure with reference to FIG. 1 onward.

FIG. 1 illustrates an example of an image of an apple shot with an imaging apparatus, an example of an image processing apparatus.

Light is shined from front top of the apple depicted in the figure, with areas having much reflected light appearing as "blown-out highlight" regions.

"Blown-out highlight" regions are regions that are output and displayed as totally white because of loss of the original colors and shades of gray of the subject.

Although a red apple was shot in the example depicted in the figure, the red color of the apple is not reproduced at all in the blown-out highlight regions, and it is impossible to check the colors and shades of gray in these regions.

The cause of occurrence of blown-out highlight regions will be described briefly below.

FIG. 2 illustrates an example of an imaging device in the imaging apparatus.

The imaging device depicted in FIG. 2 has RGB pixels arranged side by side regularly in a pattern called the Bayer pattern. The imaging device includes filters, each of which selectively passes one of the RGB colors, and the filters are provided on a semiconductor device that accumulates electric charge in proportion to the amount of light.

An output image of the imaging device is an image having an R, G, or B pixel value in each pixel. This output image of the imaging device will be referred to as a RAW image.

A RAW image records, per pixel, a pixel value for one color, i.e., one of RGB.

An image processing section of an imaging apparatus such as digital signal processor (DSP) inputs an imaging device output (analog/digital (A/D)-converted data of the RAW image) and performs a process of setting all RGB pixel values to each pixel using the input RAW image. This process is called a demosaicing or debayering process.

The demosaicing process will be described with reference to FIGS. 3(a), 3(b), 3(c) and 3(d)

The demosaicing process is conducted as a process of generating images having all RGB colors set to each pixel, i.e., RGB images depicted in FIGS. 3(b), 3(c) and 3(d) by using the RAW image depicted in FIG. 3(a) having an R, G, or B pixel value set to each pixel.

In this demosaicing process, when an R image depicted in FIG. 3(b) is generated, for example, a process is performed to calculate the R pixel values at the G and B pixel positions in the RAW image by an interpolation process using the surrounding R pixel values.

On the other hand, when the G image depicted in FIG. 3(c) is generated, a process is performed to calculate the G pixel values at the R and B pixel positions in the RAW image by an interpolation process using the surrounding G pixel values.

When the B image depicted in FIG. 3(d) is generated, a process is performed to calculate the B pixel values at the R and G pixel positions in the RAW image by an interpolation process using the surrounding B pixel values.

Thanks to these processes, the demosaicing process is conducted that sets RGB pixel values to all the pixels based on the RAW image.

A description will be given next of a relationship between the RGB images generated by the demosaicing process based on the RAW image and blown-out highlight regions with reference to FIGS. 4(a) and 4(b) onward.

FIG. 4(a) is a diagram schematically illustrating an example of an image of an apple having blown-out highlight regions described with reference to FIG. 1 and an enlarged view of a blown-out highlight region.

We assume that the pixel positions of the RGB images at the pixel positions corresponding to a horizontal line PQ in the enlarged view of a blown-out highlight region depicted in FIG. 4(a) are a pixel region made up of the third line from top having a white rectangular region in each of the RGB images depicted in FIG. 4(b).

Each of the RGB images depicted in FIG. 4(b) is an image generated from the RAW image by the demosaicing process described with reference to FIGS. 3(a), 3(b), 3(c) and 3(d).

The third pixel region P to Q from top having a white rectangular region in each of the RGB images depicted in FIG. 4(b) is equivalent to the horizontal line PQ in the enlarged view of a blown-out highlight region depicted in FIG. 4(a).

Figures 5A, 5B:
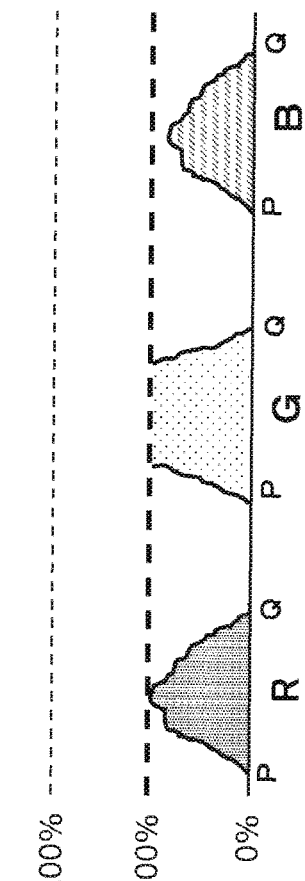
FIGS. 5(a) and 5(b) are diagrams describing an example of pixel values in blown-out highlight occurrence regions of RGB images resulting after demosaicing.

FIGS. 5(a) and 5(b) illustrate an example of pixel values in the PQ line. FIG. 5(a) is the same figure as the FIG. 4(b) FIG. 5(b) is a diagram illustrating pixel values in the line P to Q in each of the RGB images.

Pixel values between P and Q are depicted for each of RGB. The vertical axis corresponds to pixel values of each pixel. 100% means fully accumulated electric charge ratio of the imaging device and is equivalent to a saturated pixel value. For example, when a pixel value is represented by 8-bit digital data (0 to 255), 100% is equivalent to a bit value of 255 (11111111).

In the example depicted in the figures, the R and G images have pixel values of 100% or less at all pixel positions between P and Q with no saturated pixel values.

However, the G image has pixel values of 100% in a given area at the center portion between P and Q. This indicates that the pixel values are saturated in this zone.

The image processing section of the imaging apparatus performs a white-balancing (WB) process using the RGB images resulting after demosaicing depicted in FIG. 5(b).

An example of the white-balancing (WB) process will be described with reference to FIGS. 6(a) and 6(b).

FIG. 6(a) is the same figure as the FIG. 5(b).

FIG. 6(b) is a diagram illustrating a correction example of pixel values in the line P to Q in each of the RGB images by the white-balancing (WB) process.

The white-balancing process is conducted to bring the white regions of the output image closer to their actual white colors.

This white-balancing process is conducted as a process of multiplying each of the RGB pixel values by a given WB parameter, for example, in accordance with the imaging device characteristic.

In the example depicted in FIG. 6(b), the R pixel values resulting after the WB process are calculated by multiplying the R pixel values by a multiplication parameter of 2.5.

Further, the B pixel values resulting after the WB process are calculated by multiplying the B pixel values by a multiplication parameter of 2.0.

In general, the WB process is performed as a process of changing each of the R and B pixel values by multiplying only R and B by a given parameter with respect to the G pixel.

As illustrated in FIG. 6(b), the maximum R pixel value resulting after the WB process is nearly 200%, and that of the B pixel is also nearly 200%.

It should be noted that 200% is equivalent to twice as much accumulated electric charge as 100% accumulated electric charge of the imaging device. When represented by 8-bit digital data (0 to 255), 200% is equivalent to twice the bit value of 255(11111111), i.e., the bit value of 510, which is a value that cannot be represented by 8-bit data.

The image processing section of the imaging apparatus further generates data for output to the display section or image data for storage in the storage section based on the image resulting after the white-balancing process (RGB image).

This process will be described with reference to FIGS. 7(a) and 7(b).

Figure 7A:
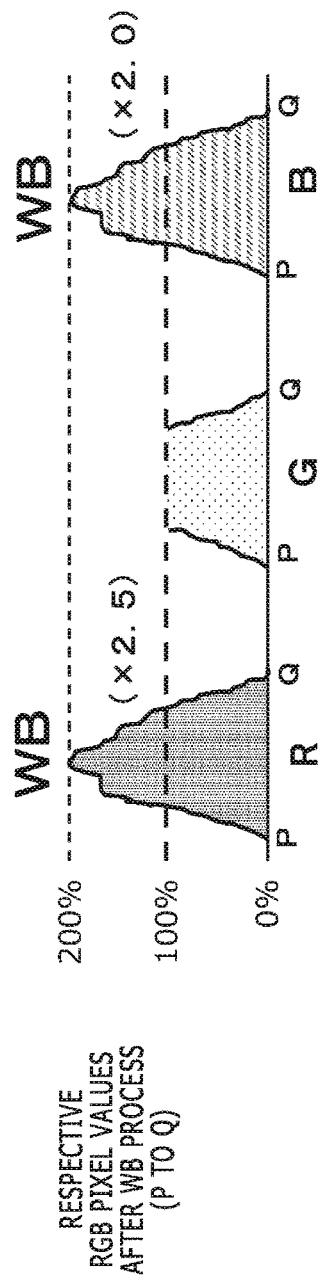
FIGS. 7(a) and 7(b) are diagrams describing a clipping process.
Figure 7B:
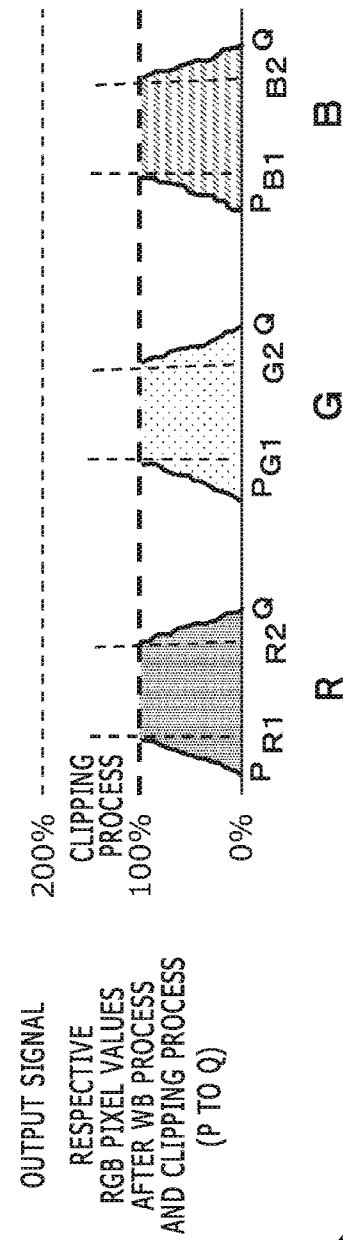

FIG. 7(a) is the same figure as the FIG. 6(b) FIG. 7(b) is a diagram describing a processing example that generates image data for output to the display section or for storage in the storage section based on the image resulting after the white-balancing process (RGB image) depicted in FIG. 7(a).

A common display apparatus, specifically a display apparatus capable of displaying standard dynamic range (SDR) images, can output pixel values of 0% to 100% depicted in the figures such as 8-bit digital data (0 to 255) but cannot output pixel values equivalent to 100% to 200% depicted in the figures (bit values of 0 to 510).

Therefore, when image data is generated for output to the display section or for storage in the storage section based on the image resulting after the white-balancing process (RGB image), a clipping process is performed to set all RGB pixel values with 100% or more pixel values to 100%.

That is, the clipping process depicted in FIG. 7(b) is performed. As a result of the white-balancing (WB) process described earlier with reference to FIGS. 6(a) and 6(b), regions have emerged in the R and B images where the pixels are set to 100% or more. The clipping process is performed to set all these pixel regions with 100% or more pixel values to 100%.

As a result, the RGB output pixel values depicted in FIG. 7(b) are determined and output to the display section.

The respective RGB pixel values depicted in FIG. 7(b) are the output pixel values RGB in the zone of the line P to Q of the blown-out highlight region depicted in FIG. 4(a).

As illustrated in FIG. 7(b) the pixel values are saturated for all RGB at the center portion in the P to Q zone.

A display apparatus that outputs 8-bit digital data (0to 255) produces a maximum output of 255 for RGB.

That is, the RGB pixels all have their maximum output pixel values, producing an output with a blown-out highlight region in this zone.

In the blown-out highlight region, it is completely impossible to recognize the original colors and shades of gray of the subject, significantly degrading the image quality.

2. About an Embodiment for Reducing Blown-Out Highlight Regions by Performing a Pixel Value Estimation Process A description will be given next of an embodiment for reducing blown-out highlight regions by performing a G pixel value estimation process.

FIG. 8(a) is a figure similar to that described with reference to FIG. 6(b) and is a figure that illustrates an example of a white-balancing (WB) process on RGB images resulting after demosaicing.

As described with reference to FIGS. 7(a) and 7(b), performing a clipping process that cuts off the 100% or more pixel regions of the RGB images resulting after the white-balancing (WB) process leads to emergence of a saturated pixel value region of a given length where R=G=B=100% in the center region in the P to Q zone, and this region turns into a blown-out highlight region.

A description will be given of a processing example of the present disclosure for reducing this blown-out highlight region with reference to FIG. 8(b) onward.

FIG. 8(b) illustrates a processing example for estimating pixel values of a subject in a 100% or more saturated pixel region of a G image by using RGB images resulting after the white-balancing (WB) process.

As described earlier with reference to FIGS. 6(a) and 6(b), the R and B pixel values are multiplied by white-balancing multiplication parameters of 1 or more in the white-balancing (WB) process. As a result of this process, the pixel values of the R and B images are set to 100% or more that is equivalent to a saturated pixel value of the imaging device.

However, pixel value conversion often does not take place in the G image during the white-balancing process. As a result, 100% or more pixel values do not occur.

In the process of the present disclosure, a process is performed to estimate the pixel values of the saturated pixel region (100% region) of the G image based on the R and B images generated by the white-balancing process.

Specifically, a pixel value G (x,y) of the G pixel at each coordinate position (x,y) in the saturated pixel region (100% region) of the G image is estimated by using a pixel value R (x,y) at the same pixel position (x,y) of the R image resulting after the white-balancing process and a pixel value B (x,y) at the same pixel position (x,y) of the R image resulting after the white-balancing process.

In the G image depicted in FIG. 8(b), a pixel zone G1 to G2 within the pixel zone P to Q is a saturated pixel region (100%).

The G pixel value of this pixel zone G1 to G2 is estimated by using the pixel values R (x,y) and B (x,y) of the R and B images resulting after the white-balancing process at the same pixel position (x,y).

A description will be given below of a specific example of a G pixel value estimation process with reference to FIGS. 9(a) and 9(b) onward.

Figure 9A:
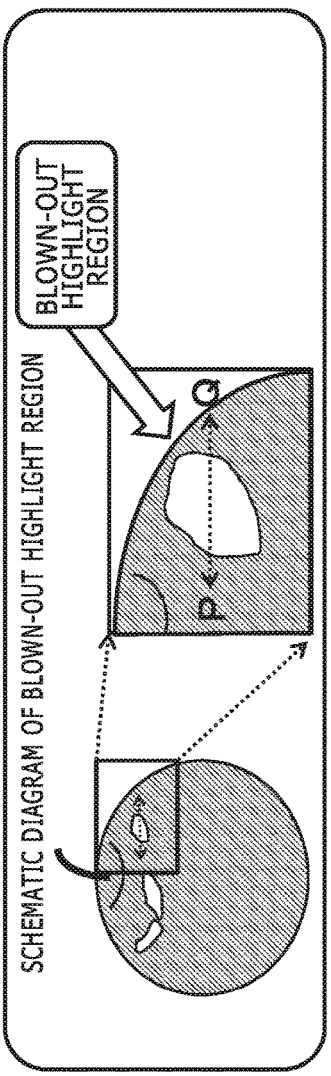
FIGS. 9(a) and 9(b) are diagrams describing the G pixel value estimation process.
Figure 9B:
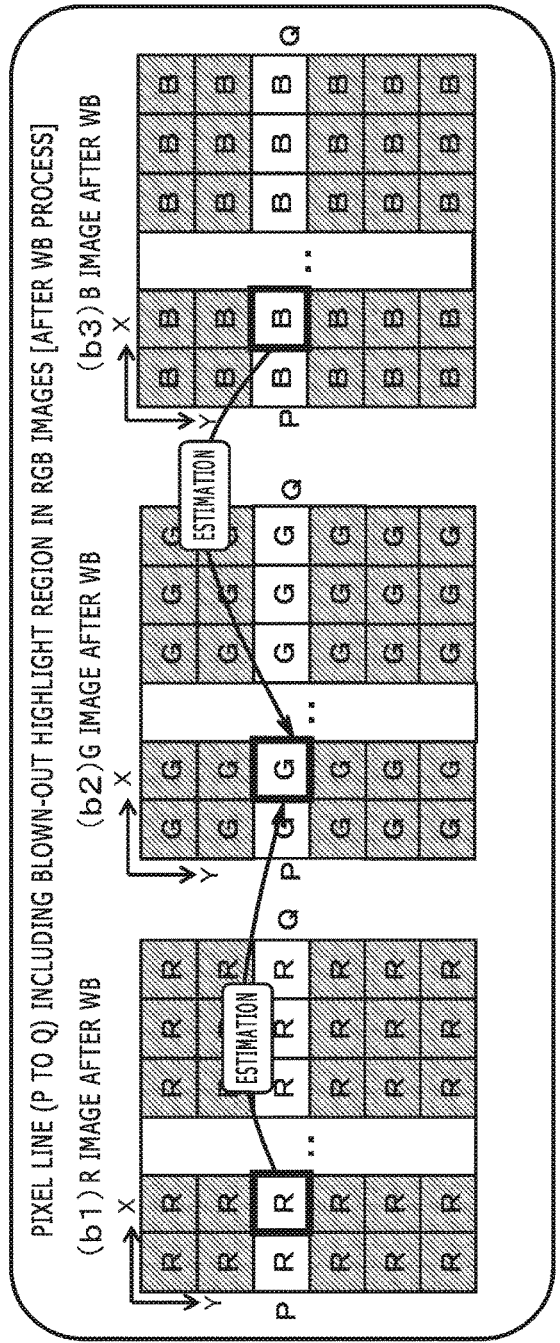

FIGS. 9(a) and 9(b) illustrate a conventional shot image, and FIG. 9(a) illustrates areas where blown-out highlight regions occur, and FIG. 9(b) illustrates an example of corresponding pixel positions in RGB images used for the G pixel value estimation process.

One pixel line zone that includes a blown-out highlight region in FIG. 9(a) is denoted as P to Q. The third pixel region P to Q from top having a white rectangular region in each of the RGB images depicted in FIG. 9(b) is equivalent to the horizontal line PQ in the enlarged view of a blown-out highlight region depicted in FIG. 9(a).

We assume, for example, that the pixel value of one pixel position (x,y)=(2,3) depicted in a bold frame in the G image depicted in (b2) of FIG. 9(b) is G(2,3). When the pixel value G(2,3) is a saturated pixel value (100%), the original pixel value of this pixel position (2,3), i.e., the original pixel value G(2,3) that is 100% or more, is estimated.

Specifically, the original pixel value of the pixel value G(2,3), i.e., the original pixel value of 100% or more, is estimated by using the pixel values R(2,3) and B(2,3) of the R and B images resulting after the white-balancing (WB) process at the same position as the coordinate position (2,3).

This estimation process is a process based on the phenomenon that colors observed from a subject depend on light source characteristic, object's reflectance, and visual characteristic.

A description will be given of colors observed from a subject with reference to FIGS. 10(a), 10(b) and 10(c).

As illustrated in FIGS. 10(a), 10(b) and 10(c), colors observed from a subject are defined by the following calculation formula:

Color=Light Source Characteristic Object's Reflectance Visual Characteristic

FIG. 10(a) illustrates the sun as an example of a light source.

A sun's light source S (λ) has light at a wavelength approximately from 400 to 760 nm as light in the visible range.

FIG. 10(b) illustrates a red apple as an example of an object. As illustrated in the figure, the reflectance of the red apple is high at the red portion in the long wavelength range. However, the reflectance is not 0, and the apple has a given reflectance even in the short wavelength range that corresponds to the blue region.

FIG. 10(c) illustrates the visual characteristic of a human eye. The human eye has individual cells that transmit signals proportional to inputs of RGB light beams having respective wavelengths.

The human eye has cells with three different visual sensitivity characteristics like RGB curves depicted at the bottom in FIG. 10(c), distinguishing the colors based on outputs thereof.

Thus, the colors to be distinguished by observing a subject by humans depend on three factors, namely, light source characteristic, object's reflectance, and visual characteristic, and can be expressed, for example, by the following formula:

Color=Light Source Characteristic×Object's Reflectance×Visual Characteristic

What can be understood from the object's reflectance depicted in FIG. 10(b) is that a given amount of reflectance is maintained continuously from short (blue) to long (red) wavelength (B to G to R) without dropping to 0.

It is predicted that, even when found in a simplified manner from the reflectance of the short-wavelength light (B) and that of the long wavelength light (R), the reflectance of G in the medium wavelength range will not deviate significantly.

The process of the present disclosure is a process that attempts to estimate, based on such a prediction, the original pixel value of the G pixel in a saturated pixel value region that corresponds to a blown-out highlight region from the actual pixel values of the R and B pixels.

A description will be given of a specific example of a G pixel value estimation process with reference to FIG. 11.

The G pixel value in a saturated pixel value region is calculated in accordance with the following two steps as illustrated in FIG. 11.

(Step S1)

Find the ratio of G(x,y) to R(x,y) and that of G(x,y) to B(x,y) in the valid range of the G(x,y) value.

$$GR\_ratio(x,y)=G(x,y)/R(x,y)$$

$$GB\_ratio(x,y)=G(x,y)/B(x,y)$$

(Step S2)

Estimate the pixel value G(x,y) in accordance with the following formula by using GR_ratio and GB_ratio in the invalid range of the G(x,y) value.

$$G(x,y)=\max(G(x,y), (GR\_ratio \times R(x,y)+GB\_ratio \times G(x,y))/2.0)$$

where max(a,b) is the process of selecting the maximum value from a and b.

The process in step S1 is a process that uses RGB pixel values in the range where the G(x,y) value is valid. In FIG. 11, for example, a P to G1 zone and a G2 to Q zone of the G image are zones having valid pixel values at the saturated pixel value (100%) or less, and the ratio to R(x,y) and that to B(x,y) are found using the pixel values in these zones.

Calculation formulas of the ratio (ratio), i.e., $$GR\_ratio(x,y)=G(x,y)/R(x,y)$$

$$GB\_ratio(x,y)=G(x,y)/B(x,y)$$

The RGB pixel positions used in the above formulas are all the same coordinate position.

It should be noted that various settings are possible as to the pixel value of which part of the range where the G(x,y) value is valid is to be used. However, one preferred way is to use a pixel position having a valid pixel value closest to the pixel position subject to estimation.

The process in step S2 is a process that calculates a new estimated pixel value in the range where the G(x,y) value is not valid, i.e., in the region where the G pixel value is a saturated pixel value (100%).

The estimated pixel value G(x,y) in the saturated pixel value (100%) region is calculated in accordance with the following formula by using the GR ratio (GR_ratio) and the GB ratio (GB_ratio) calculated in step S1.

$$G(x,y)=\max(G(x,y), (GR\_ratio \times R(x,y)+GB\_ratio \times G(x,y))/2.0)$$

The RGB pixel positions used in the above formula are all the same coordinate position.

Thus, the pixel value is estimated in the range where the G(x,y) value is not valid, i.e., in the region where the G pixel value is a saturated pixel value (100%).

The result thereof is a pixel value in the range from 100% to 200% depicted by a dotted line in the G image illustrated in FIG. 11.

This G pixel value estimation process generates image data that has a pixel value in the range from 0% to 200% set for each of RGB as illustrated in FIG. 11.

However, the RGB images made up of pixel values of 0% to 200% can be displayed with an HDR display apparatus capable of outputting high dynamic range images, but cannot be displayed with a common SDR display apparatus.

In order for an SDR display apparatus to display such images, it is necessary to perform a process of converting RGB images having pixel values of 0% to 200% depicted in FIG. 11 into images having pixel values of 0% to 100%. This pixel value conversion process is called a tone mapping process.

A description will be given below of this tone mapping process with reference to FIGS. 12(a) and 12(b).

The tone mapping process is a process that, by converting HDR images into ordinary SDR images with a low dynamic range, generates images made up of pixel values that can be output by a common SDR display apparatus.

FIG. 12(a) illustrates RGB images generated by performing the G pixel value estimation process using RGB images resulting after the white-balancing (WB) process described earlier with reference to FIG. 11.

The pixel values of the RGB images fall within the 0% to 200% range and are equivalent to HDR images having a dynamic range that cannot be represented by an ordinary SDR display apparatus.

It should be noted that a pixel value from 0% to 100% is equivalent, for example, to a pixel value that can be represented by 8-bit data ranging from 0 to 255, and that a pixel value from 0% to 200% is equivalent, for example, to a pixel value ranging from 0 to 511.

An SDR display apparatus capable of outputting 8-bit data can output a pixel value from 0 to 255 but cannot output a pixel value from 0 to 511.

The tone mapping process is performed as a process of converting RGB images equivalent to HDR images having pixel values from 0 to 511 into SDR images having pixel values from 0 to 255.

An example of the tone mapping process will be described.

The tone mapping process can be performed, for example, as a process using an optical-electro transfer function (OETF). Specifically, the tone mapping process is performed, for example, as a process of converting pixel values in accordance with the following formula:

$$V = \begin{cases} 4.5L & \text{for } 0 \le L < b \\ aL^{0.45} - (a-1) & \text{for } b \le L \le c \\ d\ln(L) + e & \text{for } c < L \end{cases} \quad \text{Formula 1}$$

In the above formula,
V: Output voltage
L: Luminance
a, b, c, d, e: Conversion factors (conversion parameters)

It should be noted that "a," "b," "c," "d," and "e" are set as appropriate, for example, according to the characteristic of the display section.

The above formula is an example of a calculation formula of an output voltage (V) that defines the output pixel value of an SDR display apparatus.

The pixel value conversion formula for the tone mapping process is not limited to the above formula, and various conversion formulas can be used according to the characteristic of the display apparatus.

The tone mapping process converts HDR-equivalent images having pixel values from 0% to 200% into SDR-equivalent images made up of pixel values from 0% to 100% as illustrated in FIG. 12(b).

The image signals resulting after the conversion are all made up of pixel values of 100% or less such as those falling within the range from 0 to 255 of 8-bit digital data and can be displayed with an SDR display apparatus.

Figure 13A:
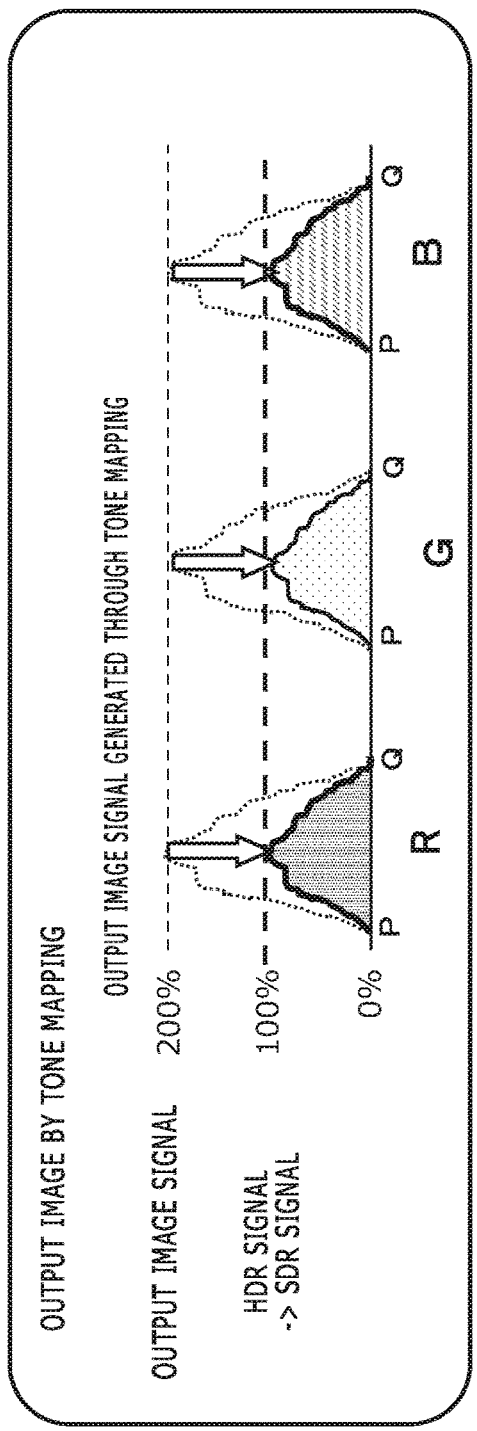
FIGS. 13(a) and 13(b) are diagrams describing an output image generated by the tone mapping process.

FIG. 13(a) illustrates examples of RGB image signals generated by the tone mapping process.

All RGB image signals fall within the range of pixel values (0% to 100%) that can be represented, for example, by 8-bit data that can be output to an SDR display apparatus as valid pixel values.

Figure 13B:
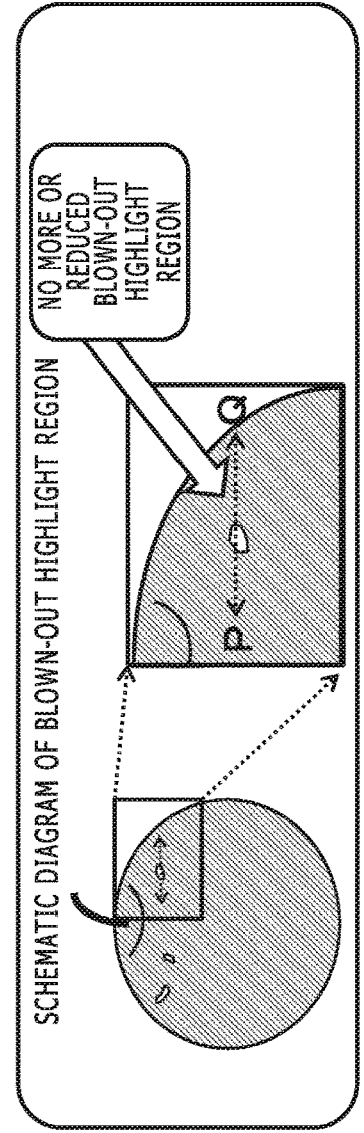

When these RGB image signals are displayed on an SDR display apparatus, it is possible to display and output an image having no more or reduced blown-out highlight regions as illustrated in FIG. 13(b).

The above process can be performed on a shot-image-by-shot-image basis and can be used not only for still images but also for videos.

The merging process of a plurality of long and short exposure images described earlier as a dynamic range expansion process for still images requires a processing time, and it is difficult to use the merging process for videos.

However, the above configuration using the G pixel value estimation process can be performed on a shot-image-by-shot-image (frame-by-frame) basis making up a video, making it possible to display a shot video without incurring much delay in processing time.

In particular, the tone mapping is an optimal process when it is necessary to perform processes by checking shot images in real time.

A specific example is an endoscope. When a surgery is conducted using an endoscope, identicality between shot and observed images, i.e., real-timeness, is required.

The above configuration using the G pixel value estimation process allows for immediate correction and display of a shot image, making it optimal for shooting and display processes that require real-timeness.

3. About a Processing Sequence of Processes Performed by the Image Processing Apparatus A description will be given next of a processing sequence performed by the image processing apparatus of the present disclosure with reference to the flowchart illustrated in FIG. 14.

A description will be given of processes performed by the image processing apparatus of the present disclosure, and specifically, a sequence for generating image data to be output to the display section or stored in a memory or other storage by performing the pixel value estimation process for the G pixel having a saturated pixel value described above with reference to the flowchart illustrated in FIG. 14.

Figure 14:
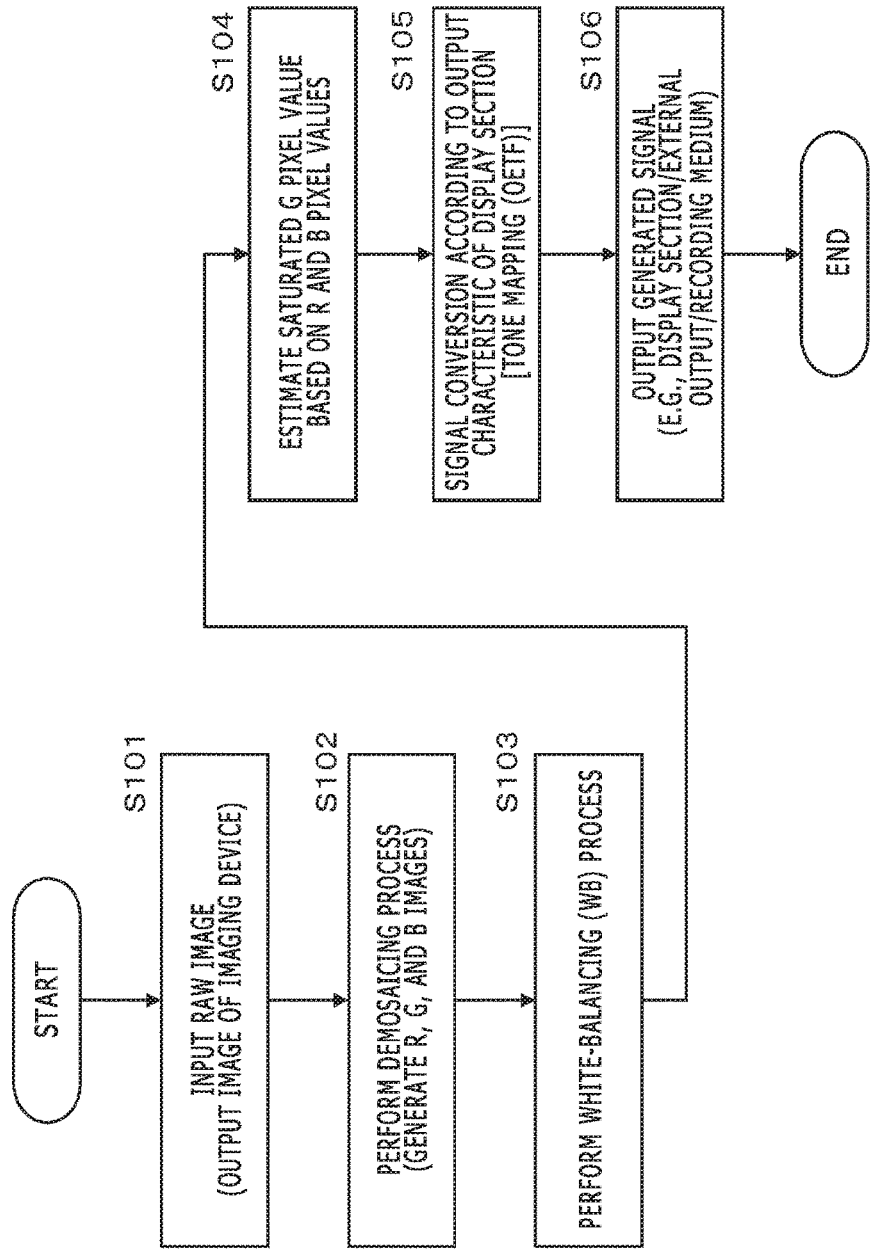
FIG. 14 is a diagram describing a flowchart that describes an image processing sequence performed by an image processing apparatus of the present disclosure.

It should be noted that the processes in accordance with the flow depicted in FIG. 14 are performed, for example, by the image processing section (e.g., DSP) having a program execution function. The program is stored in the storage section (memory) and read into the image processing section for execution.

A description will be given below of the processes in the respective steps of the flow depicted in FIG. 14 one after another.

(Step S101)

First, in step S101, the image processing section of the image processing apparatus inputs a RAW image acquired as an output of the imaging device.

As described earlier with reference to FIG. 2 and so on, the RAW image is image data that has only one of R, G, and B pixel values set for each of the pixel positions.

(Step S102) Next, in step S102, the image processing section performs a demosaicing process on the RAW image.

As described earlier with reference to FIGS. 3(a), 3(b), 3(c) and 3(d), the demosaicing process is a process for generating images having all RGB colors set for each pixel, i.e., the RGB images illustrated in FIGS. 3(b), 3(c) and 3(d), by using the RAW image having one color in each pixel, i.e., a pixel value set for only one of the RGB.

When the R image depicted in FIG. 3(b) is generated, for example, this demosaicing process is performed as an interpolation process of the R pixel values at the G and B pixel positions in the RAW image using the surrounding R pixel values.

Similarly, for the G and B images, an interpolation process is performed to interpolate the pixels with no set pixel value using the surrounding G and B pixel values, generating G and B images.

(Step 103)

Next, in step S103, the image processing section performs a white-balancing (WB) process.

The white-balancing process is conducted to bring the white regions of the output image closer to their actual white colors.

As described earlier with reference to FIGS. 6(a) and 6(b), the white-balancing process is conducted as a process of multiplying each of the RGB pixel values by a given WB parameter, for example, in accordance with the imaging device characteristic.

In the example depicted in FIG. 6(b), the R pixel values resulting after the WB process are calculated by multiplying the R pixel values by a multiplication parameter of 2.5.

Further, the B pixel values resulting after the WB process are calculated by multiplying the B pixel values by a multiplication parameter of 2.0.

In general, the WB process is performed as a process of changing each of the R and B pixel values by multiplying only R and B by a given parameter with respect to the G pixel.

As illustrated in FIG. 6(b), the maximum R pixel value resulting after the WB process is nearly 200%, and that of the B pixel is also nearly 200%.

(Step S104) Next, in step S104, the image processing section performs a pixel value estimation process for the G pixel having a saturated pixel value (100%).

This process is the process described earlier with reference to FIGS. 8(a), 8(b), 9(a), 9(b), 10(a), 10(b), 10(c), and 11.

Specifically, the image processing section performs the following processes of steps 1 and 2:

(Step S1)

Find the ratio of G(x,y) to R(x,y) and that of G(x,y) to B(x,y) in accordance with the following formulas in the valid range of the G(x,y) value.

$$GR\_ratio(x,y)=G(x,y)/R(x,y)$$

$$GB\_ratio(x,y)=G(x,y)/B(x,y)$$

(Step S2)

Estimate the pixel value G(x,y) in accordance with the following formula by using GR_ratio and GB_ratio in the invalid range of the G(x,y) value.

$$G(x,y)=\max(G(x,y), (GR\_ratio \times R(x,y)+GB\_ratio \times G(x,y))/2.0)$$

where max(a,b) is the process of selecting the maximum value from a and b.

Thus, the estimated pixel value is calculated in the range where the G(x,y) value is not valid, i.e., in the region where the G pixel value is a saturated pixel value (100%).

The result thereof is a pixel value in the range from 100% to 200% depicted by a dotted line in the G image illustrated in FIG. 11.

(Step S105)

Next, in step S105, the image processing section performs a signal conversion process appropriate to the characteristic of the display section to which the signal is output, i.e., a tone mapping process.

Image data generated by the white-balancing process and the G pixel value estimation process has pixel values ranging from 0% to 200% expanded from the output pixel value range of 0% to 100% for the imaging device described earlier with reference to FIGS. 8(a), 8(b), 9(a), 9(b), 10(a), 10(b), 10(c), and 11.

Assuming that a pixel value from 0% to 100%, the range of output pixel values of the imaging device, is, for example, an 8-bit pixel value of 0 to 255, a pixel value from 0% to 200% corresponds to a pixel value of 0 to 511.

An SDR display apparatus capable of outputting 8-bit data can output pixel values of 0 to 255 but cannot output pixel values of 0 to 511.

The tone mapping process is performed as a process of converting RGB images equivalent to HDR images having pixel values from 0 to 511 into SDR images having pixel values from 0 to 255.

It should be noted that tone mapping can be performed as a process using an OETF as described earlier.

The tone mapping process generates image data that can be output to an SDR display apparatus.

This process is equivalent to the process described earlier with reference to FIGS. 12(a), 12(b), 13(a) and 13(b).

(Step S106) Finally, in step S106, the image processing section of the image processing apparatus outputs the generated signal generated by the tone mapping process in step S105 externally via the display section or the output section. Alternatively, the signal is stored in the memory.

The image displayed on the display section has no more or reduced blown-out highlight regions as described earlier with reference to FIGS. 13(a) and 13(b).

It should be noted that the processes described with reference to the flowchart depicted in FIG. 14 are performed as processes on a shot-image-by-shot-image basis. When the shot image is a still image, the processes are performed as processes for the single shot still image. When the shot image is a video, the processes are performed repeatedly every frame as processes on a frame-by-frame basis making up the video.

The processes in accordance with the flow depicted in FIG. 14 can be performed as processes on a shot-image-by-shot-image (frame-by-frame) basis making up a video, making it possible to display a shot video without incurring much delay in processing time.

This process is an optimal process when it is necessary to perform processes by checking shot images in real time as described earlier. Specifically, for example, when a surgery is conducted using an endoscope, identicality between shot and observed images, i.e., real-timeness, is required. The processes in accordance with the flow depicted in FIG. 14 allows for immediate correction and display of shot images, making it optimal for shooting and display processes that require real-timeness as when a surgery is conducted using an endoscope.

4. About a Configuration Example of the Image Processing Apparatus

A description will be given next of a configuration example of the image processing apparatus that performs the above processes in accordance with the above embodiment with reference to FIG. 15 onward.

It should be noted that the processes in accordance with the above embodiment are not limited to imaging apparatuses and can be performed in personal computers (PCs) and other apparatuses that input a RAW image and perform image processing.

A description will be given first of a configuration example of an imaging apparatus, an example of the image processing apparatus that performs processes in accordance with the embodiment described above, with reference to FIG. 15.

Figure 15:
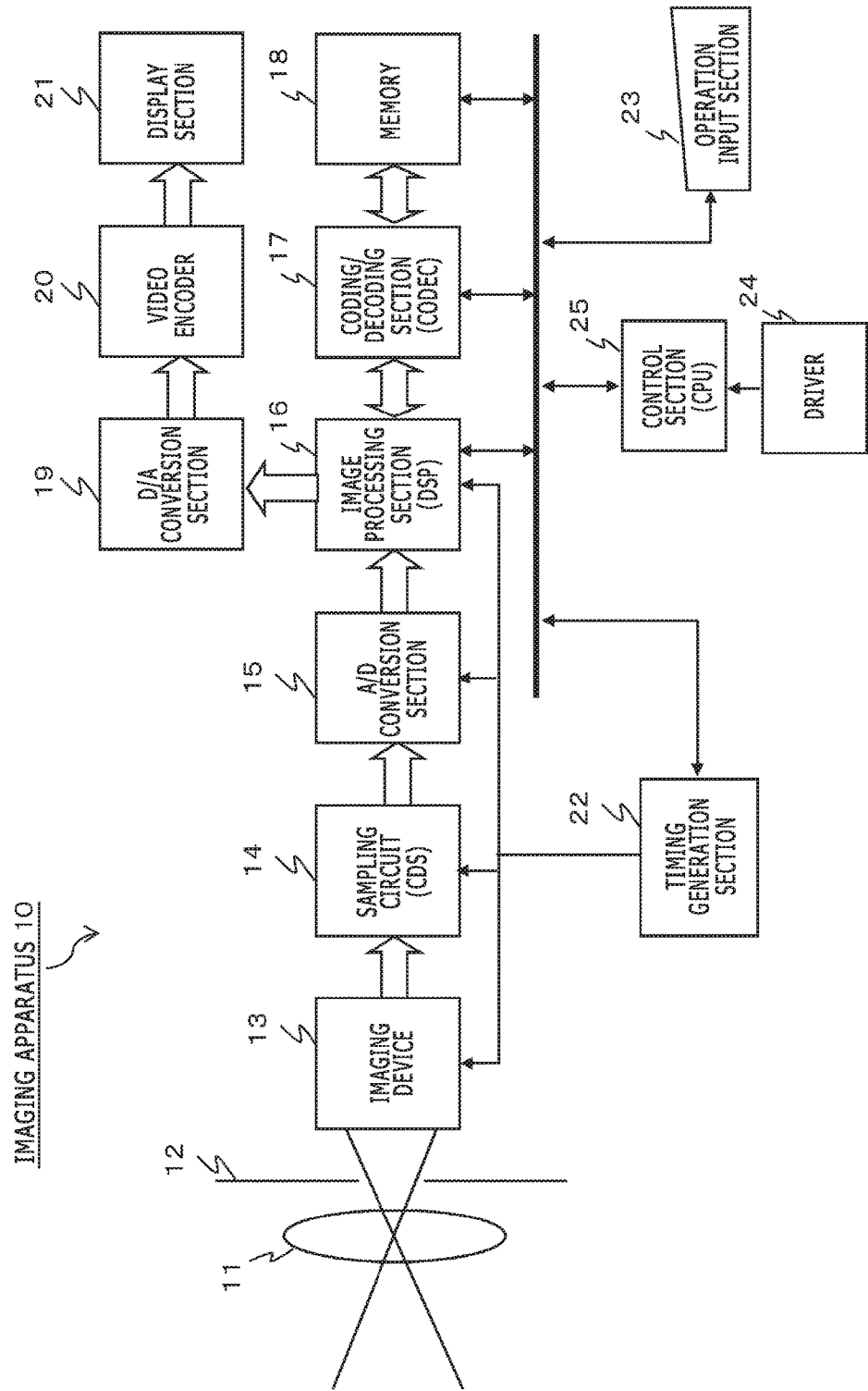
FIG. 15 is a diagram describing a configuration example of the image processing apparatus of the present disclosure.

FIG. 15 is a diagram illustrating a configuration example of an imaging apparatus 10. The imaging apparatus 10 includes optical, signal processing, recording, display, and control systems in broad classification.

The optical system includes a lens 11, an aperture 12, and an imaging device (image sensor) 13. The lens 11 collects an optical image of a subject. The aperture 12 adjusts the amount of light of the optical image from the lens 11. The imaging device 13 photoelectrically converts the collected optical image into an electric signal.

The imaging device 13 includes, for example, a CCD image sensor or a CMOS image sensor.

The imaging device 13 is, for example, an imaging device having color filters with Bayer pattern made up of RGB pixels described earlier with reference to FIG. 2.

Each pixel has a pixel value set for one of RGB colors to match with the color filter pattern.

It should be noted that the pixel pattern of the imaging device 13 depicted in FIG. 2 is an example, and that the imaging device 13 can have various other setting patterns.

Referring back to FIG. 15, the description of the configuration of the imaging apparatus 10 will be continued.

The signal processing system includes a sampling circuit 14, an A/D conversion section 15, and an image processing section (DSP) 16.

The sampling circuit 14 is realized, for example, by a correlated double sampling (CDS) circuit and generates an analog signal by sampling the electric signal from the imaging device 13. This provides reduced noise produced by the imaging device 13. The analog signal acquired by the sampling circuit 14 is an image signal for displaying the shot image of a subject.

The A/D conversion section 15 converts the analog signal supplied from the sampling circuit 14 into a digital signal and supplies the digital signal to the image processing section 16. The image processing section 16 performs given image processing on the digital signal input from the A/D conversion section 15. Specifically, the image processing section 16 inputs image data (RAW image) made up of pixel value data for one of RGB colors on a pixel-by-pixel basis described earlier with reference to FIG. 2 and performs, for example, a noise reduction process for reducing noise included in the input RAW image.

It should be noted that the image processing section 16 performs a demosaicing process of setting pixel values for all RGB colors for each pixel position of the RAW image, white-balancing (WB) adjustment, gamma correction, and other ordinary signal processing tasks for cameras, in addition to the noise reduction process.

Further, the image processing section 16 performs the above-described G pixel estimation process having a saturated pixel value, the tone mapping process that follows, and so on.

The recording system includes a coding/decoding section 17 that codes or decodes the image signal and a memory 18 that records the image signal.

The coding/decoding section 17 codes the image signal, a digital signal processed by the image processing section 16, and records the image signal to the memory 18. Further, the coding/decoding section 17 reads and decodes the image signal from the memory 18 and supplies the signal to the image processing section 16.

The display system includes a digital/analog (D/A) conversion section 19, a video encoder 20, and a display section 21. The D/A conversion section 19 converts the image signal processed by the image processing section 16 into an analog signal and supplies the signal to the video encoder 20. The video encoder 20 encodes the image signal from the D/A conversion section 19 into a video signal in the format that matches with the display section 21.

The display section 21 is realized, for example, by a liquid crystal display (LCD) and so on and displays images appropriate to the video signal based on the video signal obtained by encoding in the video encoder 20. On the other hand, the display section 21 functions as a finder during shooting of a subject.

The control system includes a timing generation section 22, an operation input section 23, a driver 24, and a control section (central processing unit (CPU)) 25. On the other hand, the image processing section 16, the coding/decoding section 17, the memory 18, the timing generation section 22, the operation input section 23, and the control section 25 are connected to each other via a bus 26.

The timing generation section 22 controls operation timings of the imaging device 13, the sampling circuit 14, the A/D conversion section 15, and the image processing section 16. The operation input section 23 includes buttons and switches, receives user's shutter operation and other command inputs, and supplies the signal appropriate to the user operation to the control section 25.

Given peripheral apparatuses are connected to the driver 24, and the driver 24 drives the connected peripheral apparatuses. For example, the driver 24 reads data from a recording medium such as magnetic disk, optical disc, magneto-optical disk, or semiconductor memory that is connected as a peripheral apparatus and supplies the data to the control section 25.

The control section 25 controls the imaging apparatus 10 as a whole. For example, the control section 25 includes, for example, a CPU having a program execution function, reads a control program from the recording medium connected to the driver 24 via the memory 18 or the driver 24, and controls the operation of the imaging apparatus 10 as a whole based on the control program and commands from the operation input section 23.

Figure 16:
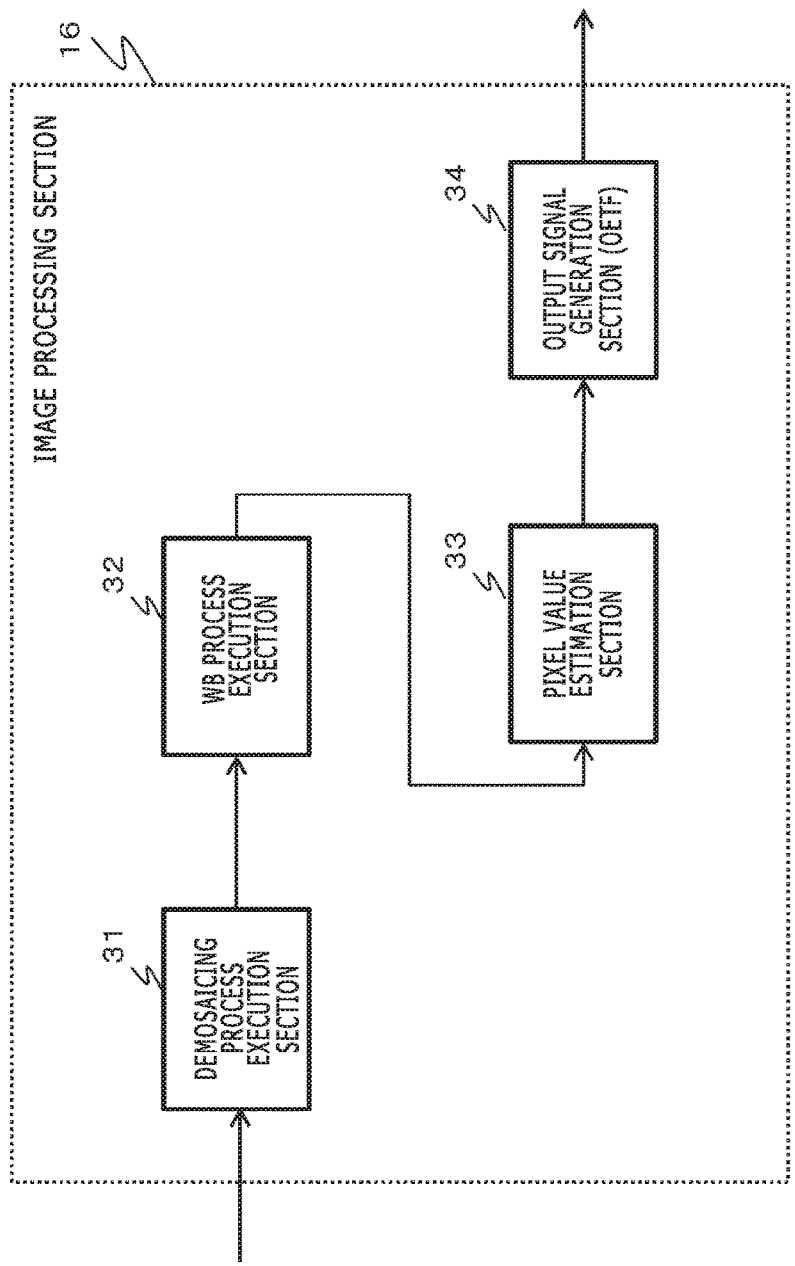
FIG. 16 is a diagram describing a configuration example of the image processing apparatus of the present disclosure.

FIG. 16 is a diagram illustrating a configuration example of the image processing section 16 of the imaging apparatus 10 depicted in FIG. 15.

A demosaicing process execution section 31 inputs, for example, an image (RAW image) shot with the imaging device (image sensor) 13 having a color filter pattern that includes the pattern described with reference to FIG. 2 and performs a demosaicing process that restores each pixel to all its colors through signal processing.

A white-balancing (WB) process execution section 32 performs the white-balancing (WB) process described earlier with reference to FIGS. 6(a) and (b). For example, the white-balancing (WB) process execution section 32 performs a process of multiplying each of the RGB pixel values by a given WB parameter, for example, according to the characteristic of the imaging device.

In the example depicted in FIG. 6(b), the white-balancing (WB) process execution section 32 calculates the R pixel values resulting after the WB process by multiplying the R pixel values by a multiplication parameter of 2.5. Further, the white-balancing (WB) process execution section 32 calculates the B pixel values resulting after the WB process by multiplying the B pixel values by a multiplication parameter of 2.0.

A pixel value estimation section 33 performs a pixel value estimation process for the G pixel having a saturated pixel value (100%).

This process is the process described earlier with reference to FIGS. 8(a), 8(b), 9(a), 9(b), 10(a), 10(b), 10(c), and 11.

Specifically, the pixel value estimation section 33 performs the following processes of steps 1 and 2:

(Step S1) Find the ratio of G(x,y) to R(x,y) and that of G(x,y) to B(x,y) in accordance with the following formulas in the valid range of the G(x,y) value.

$$GR\_ratio(x,y)=G(x,y)/R(x,y)$$

$$GB\_ratio(x,y)=G(x,y)/B(x,y)$$

(Step S2)

Estimate the pixel value G(x,y) in accordance with the following formula by using GR_ratio and GB_ratio in the invalid range of the G(x,y) value.

$$G(x,y)=\max(G(x,y), (GR\_ratio \times R(x,y)+GB\_ratio \times G(x,y))/2.0)$$

where max(a,b) is the process of selecting the maximum value from a and b.

As described above, the subject's pixel value is estimated in the range where the G(x,y) value is not valid, i.e., in the region where the G pixel value is a saturated pixel value (100%).

An output signal generation section 34 performs a signal conversion process appropriate to the characteristic of the display section to which the signal is output, i.e., a tone mapping process.

As described above, image data generated by the white-balancing process and the G pixel value estimation process has pixel values ranging from 0% to 200% expanded from the output pixel value range of 0% to 100% for the imaging device.

Assuming that a pixel value of 0% to 100%, the range of output pixel values of the imaging device, is, for example, an 8-bit pixel value of 0 to 255, a pixel value of 0% to 200% corresponds to a pixel value of 0 to 511.

An SDR display apparatus capable of outputting 8-bit data can output a pixel value from 0 to 255 but cannot output a pixel value from 0 to 511.

The tone mapping process is performed as a process of converting RGB images equivalent to HDR images having pixel values from 0 to 511 into SDR images having pixel values from 0 to 255.

It should be noted that tone mapping can be performed as a process using an OETF as described earlier.

The tone mapping process generates image data that can be output to an SDR display apparatus.

This process is equivalent to the process described earlier with reference to FIGS. 12(a), 12(b), 13(a) and (b).

It should be noted that the processes in accordance with the above embodiment are not limited to imaging apparatuses and can be performed in PCs and other apparatuses that input a RAW image and perform image processing as described earlier.

A description will be given of a hardware configuration example of the image processing apparatus such as PC with reference to FIG. 17.

FIG. 17 is a diagram describing a hardware configuration example of the image processing apparatus such as PC.

A CPU 71 functions as a data processing section that performs various processes in accordance with programs stored in a read only memory (ROM) 72 or a storage section 78. For example, the CPU 71 performs processes in accordance with the sequence described in the above embodiment. A random access memory (RAM) 73 stores programs to be executed by the CPU 71 and data. The CPU 71, the ROM 72, and the RAM 73 are connected to each other by a bus 74.

The CPU 71 is connected to an input/output (I/O) interface 75 via the bus 74, and an input section 76 and an output section 77 are connected to the I/O interface 75. The input section 76 includes various switches, a keyboard, a mouse, a microphone, and so on. The output section 77 includes a display, a speaker, and so on. The CPU 71 performs various processes in accordance with an instruction input from the input section 76 and outputs processing results, for example, to the output section 77.

The storage section 78 connected to the I/O interface 75 includes, for example, a hard disk and stores programs to be executed by the CPU 71 and various data. A communication section 79 functions as a transmission/reception section for communicating data via the Internet, local area networks, and other networks, and further as a transmission/reception section for broadcasting waves and communicates with external apparatuses.

A drive 80 connected to the I/O interface 75 drives a removable medium 81 such as magnetic disk, optical disc, magneto-optical disk, or semiconductor memory such as memory card, and records data to or reads data from the removable medium 81.

5. Conclusion of the Configuration of the Present Disclosure

Thus, an embodiment of the present disclosure has been described in detail with reference to a specific embodiment. However, it is self-evident that a person skilled in the art can conceive of modifying or substituting the embodiment without departing from the gist of the present disclosure. That is, the present invention has been disclosed as illustration and should not be interpreted restrictively. The Claim section should be taken into consideration to judge the gist of the present disclosure.

It should be noted that the technology disclosed in the present specification can have the following configurations:

(1) An image processing apparatus including:

an image processing section operable to input a RAW image corresponding to an output image of an imaging device and perform image processing on the input RAW image, in which the image processing section includes:

a demosaicing process section adapted to generate RGB images having all pixels set to respective colors of RGB by demosaicing the RAW image;

a white-balancing process execution section adapted to white-balance the respective RGB images generated by the demosaicing process section; and a pixel value estimation section adapted to perform a G pixel value estimation process in a saturated pixel region of the G image resulting after the white-balancing process, and the pixel value estimation section performs the pixel value estimation process by using pixel values of the R and B images resulting after the white-balancing process at the same pixel position as the G pixel subject to pixel value estimation.

(2) The image processing apparatus of feature (1), in which the pixel value estimation section calculates GR_ratio(x, y), the ratio of a G pixel value to an R pixel value, and GB_ratio(x,y), the ratio of the G pixel value to a B pixel value, for a pixel position (x,y) in a valid pixel region other than a saturated pixel region of the G image resulting after the white-balancing process, and the pixel value estimation section estimates a G pixel value in a saturated pixel region by using the pixel value ratios for the pixel values of the R and B images resulting after the white-balancing process at the same pixel position as the G pixel subject to the pixel value estimation.

(3) The image processing apparatus of feature (2), in which the pixel value estimation section selects a valid pixel position of the G image used for calculation of the pixel value ratios from the valid pixel region in proximity to the pixel position subject to the G pixel value estimation.

(4) The image processing apparatus of feature (2) or (3), in which the pixel value estimation section calculates the pixel value G(x,y) of the pixel position (x,y) in the saturated pixel region of the G image resulting after the white-balancing process in accordance with the following formula:

$$G(x,y)=\max(G(x,y), (GR\_ratio \times R(x,y)+GB\_ratio \times G(x,y))/2.0)$$

where max(a,b) is the process of selecting the maximum value from a and b.

(5) The image processing apparatus of any one of features (1) to (4), in which the image processing section further includes:

an output signal generation section adapted to generate an output image by performing a tone mapping process on the R and B images resulting after the white-balancing process and the G image having G pixel values calculated by the pixel value estimation section and correcting the pixel values.

(6) The image processing apparatus of feature (5), in which the output signal generation section corrects the pixel values by using an optical-electro transfer function (OETF).

(7) The image processing apparatus of any one of features (1) to (6), in which the white-balancing process execution section corrects the pixel values by multiplying the R and B images generated by the demosaicing process section by a multiplication factor defined in advance.

(8) The image processing apparatus of any one of features (1) to (7), in which the imaging device has a Bayer pattern.

(9) The image processing apparatus of any one of features (1) to (8), in which the image processing apparatus is an imaging apparatus having an imaging device.

(10) The image processing apparatus of any one of features (1) to (8), including:

an input section adapted to input a RAW image, a shot image of an imaging apparatus.

(11) An image processing method for performing image processing in an image processing apparatus, the image processing apparatus including an image processing section operable to input a RAW image corresponding to an output image of an imaging device and perform image processing on the input RAW image, the image processing method including:

by the image processing section, performing a demosaicing process adapted to generate RGB images having all pixels set to respective colors of RGB by demosaicing the RAW image, a white-balancing process adapted to white-balance the respective RGB images generated by the demosaicing process, and a pixel value estimation process adapted to perform a G pixel value estimation process in a saturated pixel region of the G image resulting after the white-balancing process; and by the image processing section, in the pixel value estimation process, performing the pixel value estimation process by using pixel values of the R and B images resulting after the white-balancing process at the same pixel position as the G pixel subject to pixel value estimation.

(12) A program causing an image processing apparatus to perform image processing, the image processing apparatus including an image processing section operable to input a RAW image corresponding to an output image of an imaging device and perform image processing on the input RAW image, the program causing the image processing section to perform a demosaicing process adapted to generate RGB images having all pixels set to respective colors of RGB by demosaicing the RAW image, a white-balancing process adapted to white-balance the respective RGB images generated by the demosaicing process, and a pixel value estimation process adapted to perform a G pixel value estimation process in a saturated pixel region of the G image resulting after the white-balancing process; and perform, in the pixel value estimation process, the pixel value estimation process by using pixel values of the R and B images resulting after the white-balancing process at the same pixel position as the G pixel subject to pixel value estimation.

The series of processes described in the specification may be performed by hardware, software, or a configuration that combines the two. If the series of processes are performed by software, the program recording the processing sequence is installed to the memory of a computer built into dedicated hardware and executed. Alternatively, the program is installed to a general-purpose computer capable of performing various processing tasks and executed. For example, the program can be recorded to a recording medium in advance. In addition to installing the program from the recording medium to the computer, the program can be installed to a built-in recording medium such as hard disk by receiving the program via a network such as the Internet.

It should be noted that various processes described in the specification may be performed not only chronologically in accordance with the description but also in parallel or individually according to the processing capability of the apparatus that performs the processes or as necessary. On the other hand, the system in the present specification refers to a configuration of a logical set of a plurality of apparatuses and is not limited to apparatuses having respective configurations that are provided in the same housing.

INDUSTRIAL APPLICABILITY

Thus, as described above, according to the configuration of an embodiment of the present disclosure, an apparatus and a method are realized for generating an image with reduced blown-out highlight regions that represents colors and shades of gray of a subject with high accuracy.

Specifically, the apparatus includes an image processing section that inputs a RAW image corresponding to an output image of an imaging device and performs image processing on the input RAW image. The image processing section performs a demosaicing process, a white-balancing process, and further a pixel value estimation process for a G pixel. The demosaicing process generates RGB images having all pixels set to respective colors of RGB by demosaicing the RAW image. The white-balancing process white-balances the respective RGB images resulting after the demosaicing process. The pixel value estimation process performs a G pixel value estimation process in a saturated pixel region of the G image resulting after the white-balancing process. In the pixel value estimation process, the pixel value estimation process is performed by using pixel values of the R and B images resulting after the white balancing process at the same pixel position as the G pixel subject to pixel value estimation.

The processes in the present disclosure make it possible to generate and output an image with reduced blown-out highlight regions that represents colors and shades of gray of a subject with high accuracy.

REFERENCE SIGNS LIST

10 Imaging apparatus
11 Lens
12 Aperture
13 Imaging device
14 Sampling circuit
15 Analog/digital (A/D) conversion section
16 Image processing section (DSP)
17 Coding/decoding section
18 Memory
19 Digital/analog (D/A) conversion section
20 Video encoder
21 Display section
22 Timing generation section
23 Operation input section
24 Driver
25 Control section
31 Demosaicing process execution section
32 White-balancing (WB) process execution section
33 Pixel value estimation section
34 Output signal generation section
71 CPU
72 ROM
73 RAM
74 Bus
75 Input/output interface
76 Input section
77 Output section
78 Storage section
79 Communication section
80 Drive
81 Removable medium

The invention claimed is:

1. An image processing apparatus, comprising:
circuitry configured to:
input a RAW image corresponding to an output image of an imaging device;
demosaic the input RAW image;
generate RGB images having all pixels set to respective colors of RGB based on the demosaiced RAW image;
white-balance the generated RGB images; and
estimate a G pixel value in a saturated pixel region of a white-balanced G image of the white-balanced RGB images based on pixel values of white-balanced R and B images of the white-balanced RGB images at a same pixel position as a G pixel of the pixels subject to the estimation.

2. The image processing apparatus of claim 1, wherein the circuitry is further configured to:
calculate G_ratio (x, y) and GB_ratio (x, y),
wherein the GR_ratio (x, y) is a ratio of a G pixel value to an R pixel value and the GB_ratio (x, y) is a ratio of the G pixel value to a B pixel value, for a pixel position (x, y) in a valid pixel region other than the saturated pixel region of the white-balanced G image; and
estimate the G pixel value in the saturated pixel region based on the ratios for the pixel values of the white-balanced R and B images at the same pixel position as the G pixel subject to the estimation.

3. The image processing apparatus of claim 2, wherein the circuitry is further configured to select a valid pixel position of the white-balanced G image used for calculation of the ratios from the valid pixel region in proximity to the pixel position subject to the estimation.

4. The image processing apparatus of claim 2, wherein the circuitry is further configured to calculate a pixel value G (x, y) of the pixel position (x, y) in the saturated pixel region of the white-balanced G image based on the following formula:

$$G(x, y) = \max(G(x, y), (GR\_ratio \times R(x, y) + GB\_ratio \times G(x, y))/2.0),$$

where max (a, b) is a process to select a maximum value from a and b.

5. The image processing apparatus of claim 1, wherein the circuitry is further configured to generate the output image based on a tone mapping process on the white-balanced R and B images and the white-balanced G image having the estimated G pixel value, and based on correction of the pixel values.

6. The image processing apparatus of claim 5, wherein the circuitry is further configured to correct the pixel values based on an optical-electro transfer function.

7. The image processing apparatus of claim 1, wherein the circuitry is further configured to correct the pixel values based on multiplication of the generated R and B images by a multiplication factor defined in advance.

8. The image processing apparatus of claim 1, wherein the imaging device has a Bayer pattern.

9. The image processing apparatus of claim 1, wherein the image processing apparatus is an imaging apparatus having the imaging device.

10. The image processing apparatus of claim 1,
wherein the circuitry is further configured to input, as the RAW image, a shot image of an imaging apparatus.

11. An image processing method comprising:
inputting a RAW image corresponding to an output image of an imaging device;
demosaicing, by circuitry, the input RAW image;
generating, by the circuitry, RGB images having all pixels set to respective colors of RGB based on the demosaiced RAW image;
white-balancing, by the circuitry, the generated RGB images; and estimating a G pixel value in a saturated pixel region of a white-balanced G image of the white-balanced RGB images based on pixel values of white-balanced R and B images of the white-balanced RGB images at a same pixel position as a G pixel of the pixels subject to the estimation.

12. A non-transitory computer-readable medium having stored thereon, computer-executable instructions which, when executed by a computer, cause the computer to execute operations, the operations comprising:

inputting a RAW image corresponding to an output image of an imaging device;

demosaicing the input RAW image;

generating RGB images having all pixels set to respective colors of RGB based on the demosaiced RAW image;

white-balancing the generated RGB images; and estimating a G pixel value in a saturated pixel region of a white-balanced G image of the white-balanced RGB images based on pixel values of white-balanced R and B images of the white-balanced RGB images at a same pixel position as a G pixel of the pixels subject to the estimation.

* * * * *